United States Patent
Moribatake et al.

(10) Patent No.: US 6,539,364 B2
(45) Date of Patent: *Mar. 25, 2003

(54) ELECTRONIC CASH IMPLEMENTING METHOD AND EQUIPMENT USING USER SIGNATURE AND RECORDING MEDIUM RECORDED THEREON A PROGRAM FOR THE METHOD

(75) Inventors: Hidemi Moribatake, Tokyo (JP); Tatsuaki Okamoto, Tokyo (JP)

(73) Assignee: Nippon Telegraph and Telephone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,447

(22) Filed: Dec. 23, 1998

(65) Prior Publication Data
US 2001/0049667 A1 Dec. 6, 2001

(30) Foreign Application Priority Data
Dec. 26, 1997 (JP) .............................................. 9-359106

(51) Int. Cl.[7] .............................................. G06F 17/60
(52) U.S. Cl. .............................. 705/69; 705/1; 705/50; 705/64; 705/65; 705/66; 705/67; 705/68; 705/76; 705/78
(58) Field of Search ................................. 705/1, 78, 35, 705/39, 41, 50, 53, 64, 65, 76, 75; 380/4, 23, 24, 25, 30, 21

(56) References Cited

U.S. PATENT DOCUMENTS

| | | | | |
|---|---|---|---|---|
| 5,536,923 A | * | 7/1996 | Foglino | ...................... 235/380 |
| 5,696,827 A | * | 12/1997 | Brands | ......................... 380/30 |
| 5,889,862 A | * | 3/1999 | Ohta et al. | ...................... 380/24 |
| 5,901,229 A | * | 5/1999 | Fujisaki et al. | ................ 380/30 |
| 5,926,548 A | * | 7/1999 | Okamoto | ...................... 380/24 |
| 6,164,528 A | * | 12/2000 | Hills et al. | ................... 235/379 |
| 6,209,095 B1 | * | 3/2001 | Anderson et al. | ............ 713/176 |

FOREIGN PATENT DOCUMENTS

| | | | | |
|---|---|---|---|---|
| EP | 0 772 165 A2 | 5/1997 | ............. | G07F/7/10 |
| EP | 0 807 910 A2 | 11/1997 | | |

(List continued on next page.)

OTHER PUBLICATIONS

Tyler, Geoff, "The cashless revolution", Management Services, v39n6 pp: 26–27 Jun. 1995.*

(List continued on next page.)

Primary Examiner—Hyung-Sub Sough
Assistant Examiner—Calvin L Hewitt, II
(74) Attorney, Agent, or Firm—Connolly Bove Lodge & Hutz LLP

(57) ABSTRACT

A user registers a user public key PKU as a pseudonym at a trustee or issuer and obtains an signature for the pseudonym as a license. The sends the pseudonym, PKU identification information IdU and the amount of withdrawal x to the issuer institution. The issuer increments a balance counter of the pseudonym by x, then generates an issuer signature SKI(PKU, x) with a secret key SKI, and sends the issuer signature as an electronic cash to the user. The user verifies the validity of the issuer signature with a public key SKI, and if valid, increments an electronic cash balance counter Balance by x. At the time of payment, user sends the public key PKU and the license to a shop, and the shop verifies the validity of the license, and if valid, sends a challenge to the user. The user attaches a signature to the challenge with user secret key SKU, then sends it to the shop together with the amount due y, and decrements the electronic cash balance counter by y.

25 Claims, 30 Drawing Sheets

FOREIGN PATENT DOCUMENTS

| | | | |
|---|---|---|---|
| EP | 0 810 563 A2 | 12/1997 | |
| EP | 0 810 563 A3 | 1/2000 | |
| JP | 03-073065 | 3/1991 | |
| JP | 03-092966 | 4/1991 | |
| JP | 09006880 A * | 1/1997 | ........... G06F/15/00 |
| WO | WO 97 08870 A | 3/1997 | ............. H04L/9/32 |

OTHER PUBLICATIONS

Hidemi Moribatake et al., SCIS97–3C (Symposium on Cryptography and Information Security), 1997, pp. 1–8, Electronic Cash Scheme.

XP 000567597; *Electronic Cash on the Internet* by Stefan Brands.

Brands, S., "Off–Line Cash transfer by Smart Cards," Centrum Voor Wiskunde en Informatica Report, No. CS–R9455, Jan. 1, 1994, pp. 1–16.

Camenisch, J., et al., "An Efficient Fair Payment System," 3rd ACM Conf. on Computer and Communications Security, New Delhi, Mar. 14–16, 1996, No. Conf. 3, Mar. 14, 1996, pp. 88–94.

New Electronic Money System NTT Review, vol. 8, No. 6, Nov. 1, 1996, p. 4.

Zuzuki, M., et al., "Electronic Cash System," NTT Review, vol. 8, No. 4, Jul. 1, 1996, pp. 10–15.

* cited by examiner

ELECTRONIC CASH IMPLEMENTING METHOD AND EQUIPMENT USING USER SIGNATURE AND RECORDING MEDIUM RECORDED THEREON A PROGRAM FOR THE METHOD

BACKGROUND OF THE INVENTION

The present invention relates to a method and equipment for implementing electronic cash through utilization of an electrical communication system, or a smart card or the like which records information.

Conventional electronic cash techniques or schemes are disclosed, for example, in Japanese Patent Publication 7-052460 entitled "Method and Apparatus for Implementing Electronic Cash," Japanese Patent Application Laid-Open Nos. 4-367070 entitled "Electronic Cash Implementing Method," 5-20344 entitled "Electronic Cash Implementing Method," 7-302288 entitled "Electronic Cash System," 8-87559 entitled "Electronic Cash Implementing Method and Electronic Cash System," and 9-128465 entitled "Electronic Cash Implementing Method with A Trustee."

In these electronic cash schemes proposed so far, electronic cash is attached with a signature of an electronic cash issuing institution (hereinafter referred to also as an issuer) for information which specifies the user of the electrnic cash and the amount of money issued. The user stores the issued electronic cash in user equipment, and for each purchase, sends the electronic cash to a shop in a required amount. The shop makes a check to see if the electronic cash sent thereto is affixed with a valid signature, and if so, receives the electronic cash. The receiver, that is, the shop returns electronic cash information to the issuer for conversion. The issuer verifies the electronic cash information returned thereto to check for an improper use.

With the conventional electronic cash schemes mentioned above, the issuer manages information for each issuance of electronic cash, and the issued electronic cash returns via the user and the shop to the issuer, which checks the electronic cash for improper use. This method has such disadvantages as listed below.

- The user is required to have a storage device for holding electronic cash issued to him.
- The receiver, a bank and the electronic cash issuer are each required to have a device and time for verifying electronic cash.
- The issuer is required to have a particularly large-capacity storage for storing information corresponding to electronic cash issued.
- Since the user specifying information (pseudonym) is determined at the time of issuance of electronic cash, it cannot be changed to a different pseudonym when the user makes a payment by electronic cash.

SUMMARY OF THE INVENTION

It is therefore an object of the present invention to provide an electronic cash implementing method and equipment which dispense with storage devices for the storage of electronic cash by enabling users to make payments with their signatures alone and by making a check in an electronic cash issuing institution for an improper user of electronic cash for each user and, moreover, provide increased security for user privacy by allowing the users to use different pseudonyms for requesting the issuance of electronic cash and for making payments to shops.

The issuer equipment has a balance counter for each user, issues electronic cash in response to a request from user equipment, then increments the balance counter by the amount of electronic cash issued, and upon receiving electronic cash returned thereto, decrements the balance counter by the amount returned.

The user has a balance counter in user equipment, and upon receiving electronic cash issued from the issuer, increments the balance counter by the amount of issue. Upon making a payment by electronic cash, the user decrements the balance counter by the amount paid. The user is allowed to make payments by his signature until the balance counter goes down to zero.

Shop equipment makes a check to see if the user signature is valid, and if so, receives the payment, stores the user signature, and returns it to the issuer equipment for conversion.

With the above scheme according to the present invention, the user equipment is enabled to render payment without the need to have a storage for storing electronic cash. The issuer equipment is capable of managing electronic cash information by the balance counter, and hence does not need to store the information. Moreover, since the user is allowed to selectively use any one of a plurality of user signatures when he makes a payment, his privacy can be protected with much ease.

DETAILED DESCRIPTION OF THE PREFERRED EMBODIMENTS

First Embodiment

Figure 1:
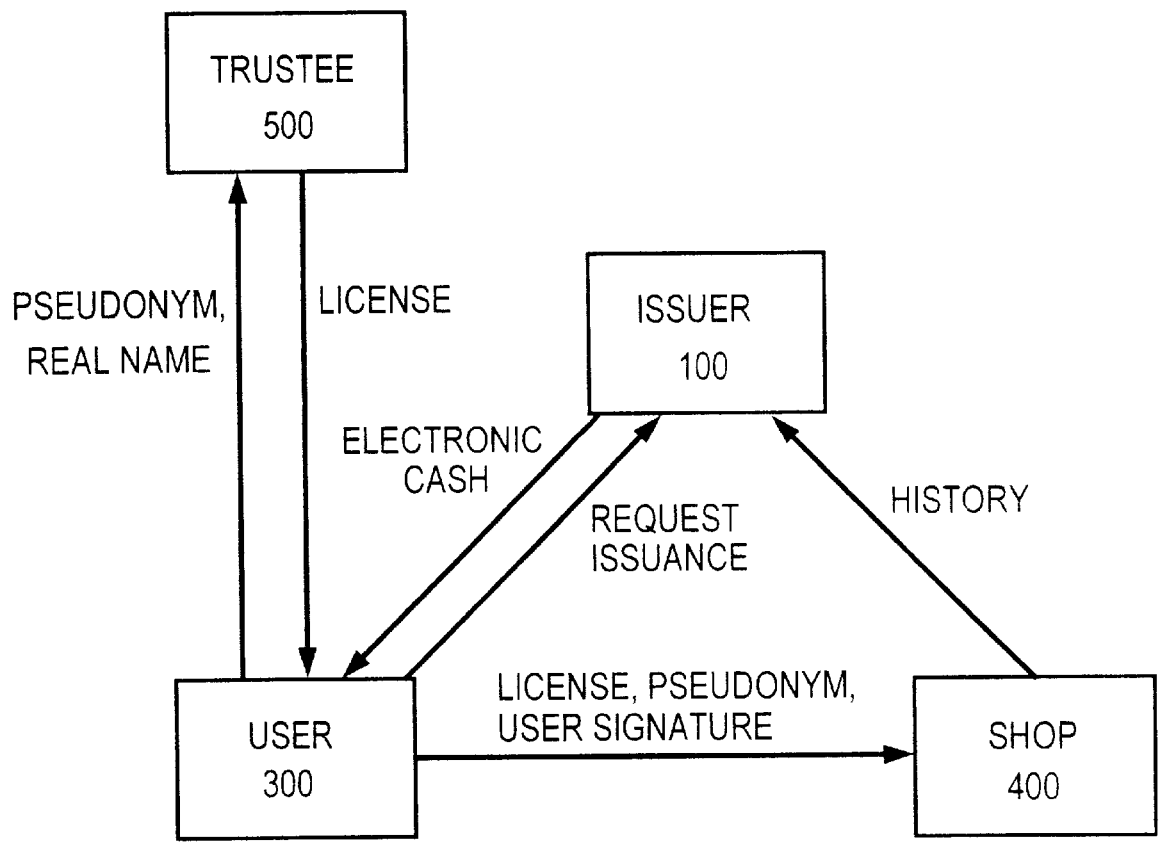
FIG. 1 is a block diagram illustrating the prime system constituents for a first embodiment of the present invention.

FIG. 1 illustrates in block form the basic configuration of the electronic cash system according to a first embodiment of the present invention. Trustee equipment (hereinafter also referred to simply as a trustee) 500, electronic cash issuing equipment (hereinafter also referred to simply as an issuer) 100, user equipment (hereinafter also referred to simply as a user) 300 and shop equipment (hereinafter also referred to simply as a shop) 400 are connected via communication lines, for instance, but they may also be connected via smart cards or the like which are capable of recording information.

In the illustrated electronic cash system, the user 300 registers with the trustee 500 in his real name to use electronic cash, and receives a license, after which he requests the issuer 100 to issue electronic cash and receives it. The user 300 shows the shop 400 the license, and makes a payment by sending an arbitrary amount due and his signature to the shop 400. The shop 400 sends a history of communications with the user 300 to the issuer 100 for conversion. The first embodiment of the invention will be described below in detail.

(1) User Registration Procedure

Figure 2:
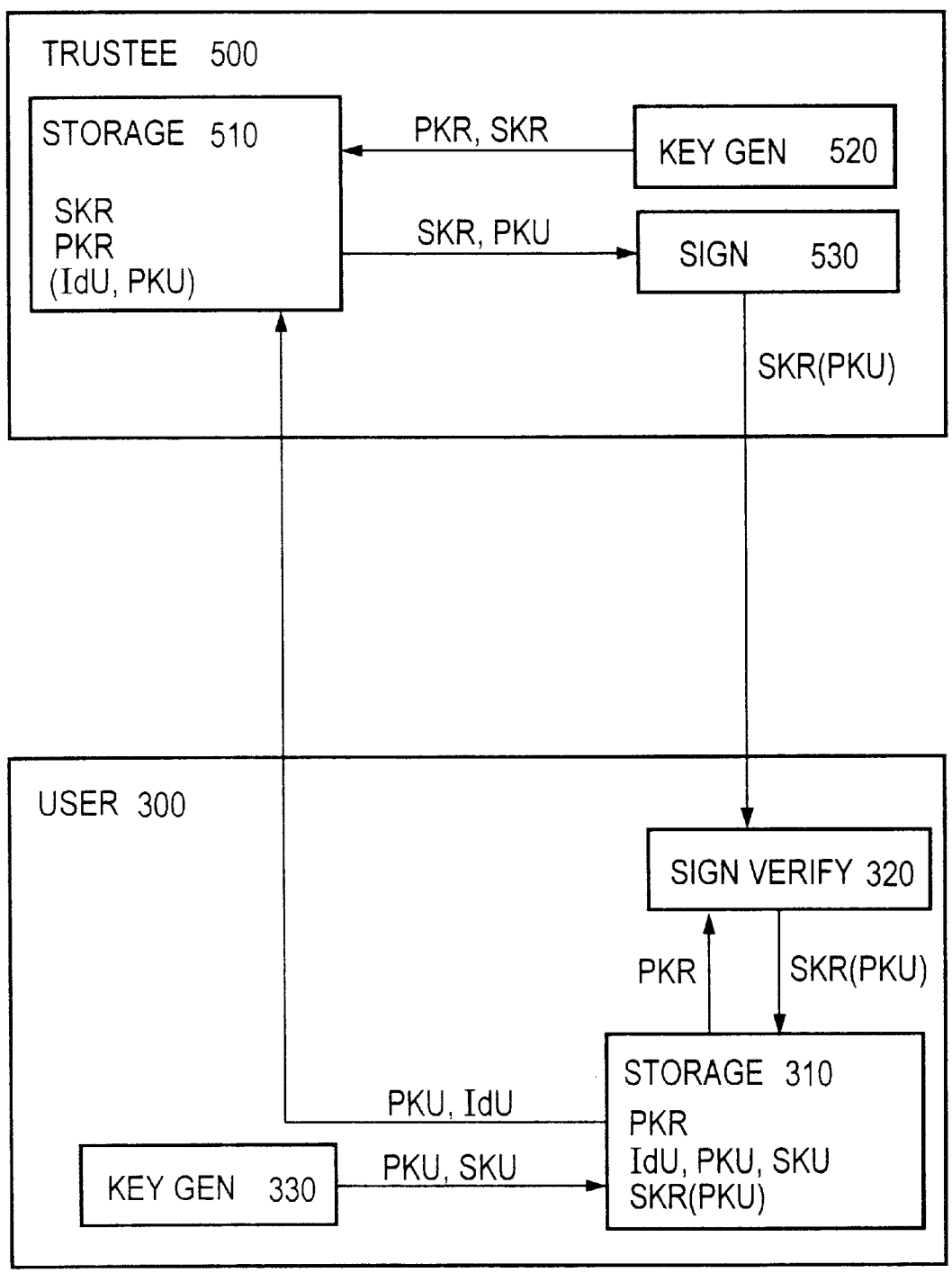
FIG. 2 is a block diagram depicting the functional configuration for a user registration process according to the first embodiment.

FIG. 2 is a diagrammatic representation of the functional configuration for user registration procedure. The trustee equipment 500 is provided with a storage device 510, a key generating device 520 and a signature generating device 530. Let it be assumed that the trustee equipment 500 generates a secret key SKR and a public key PKR by the key generating device 520, prestores them in the storage 510, and publishes the public key PKR to the user 300 and the shop 400 in advance.

The user equipment 300 is provided with a storage device 310, a signature verifying device 320 and a key generating device 330. The user equipment 300 generates a secret key SKU and a public key PKU by the key generating device 330, stores them in the storage device 310, and sends the public key PKU and a user real name IdU to the trustee equipment 500.

The trustee equipment 500 stores the public key PKU and the user real name IdU in the storage device 510, generates a trustee signature (hereinafter referred to as a license) SKR(PKU) for the public key PKU by the signature generating device 530 using the secret key SKR, and sends the license to the user equipment 300. The key PKU is used both as a public key and as a user pseudonym in the payment procedure described later on.

The user equipment 300 verifies the validity of the license SKR(PKU) by the signature verifying device 320 using the public key PKR, and if it is found valid, stores it in the storage device 310.

(2) Withdrawal Procedure

Figure 3:
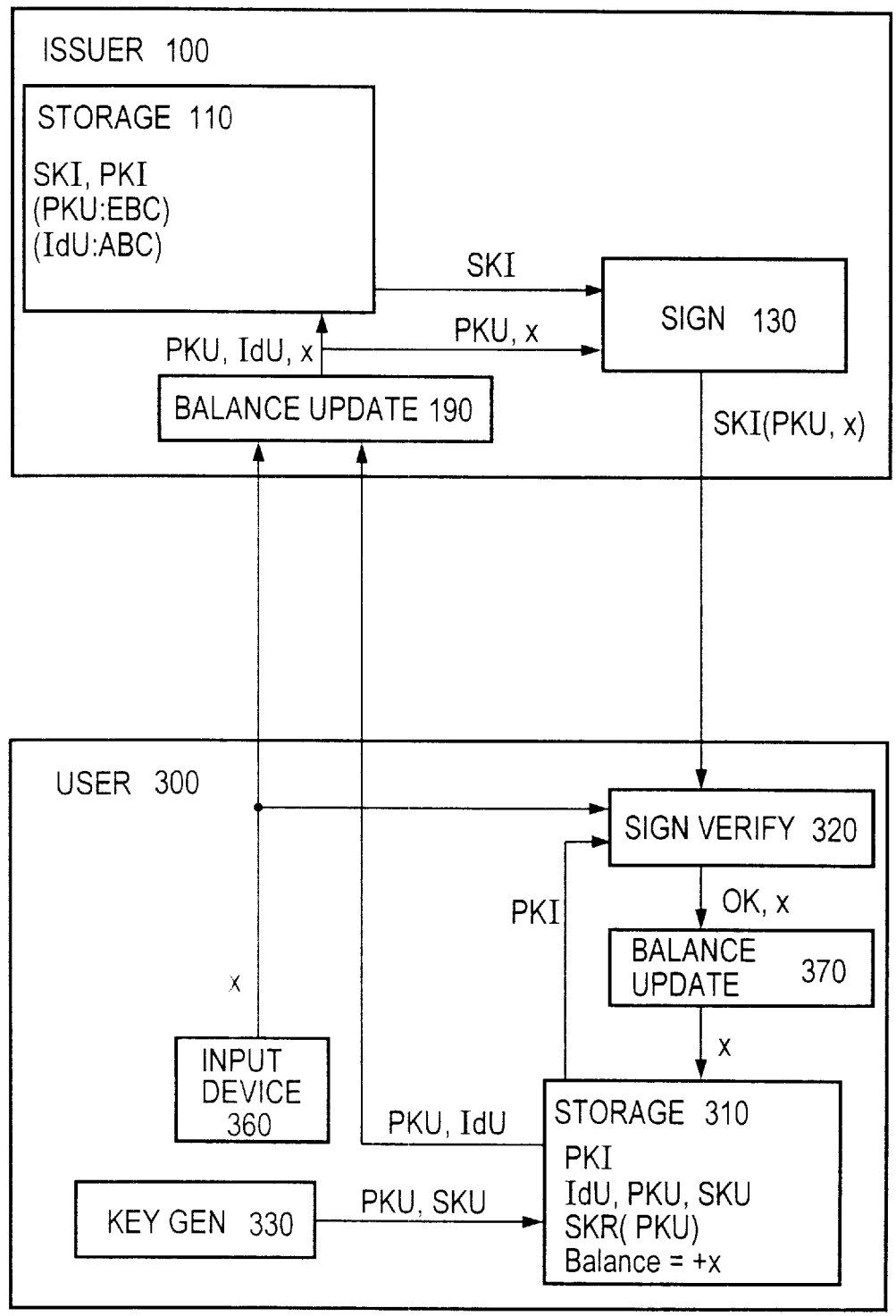
FIG. 3 is a block diagram depicting the functional configuration for a withdrawal process according to the first embodiment.

A description will be given of the withdrawal procedure between the user 300 and the issuer 100. As depicted in FIG. 3, the issuer equipment 100 is provided with a storage device 110, a signature generating device 130 and a balance updating device 190. The user equipment 300 further comprises an input device 360 and a balance updating device 370. In this instance, the user equipment 300 sends to the issuer equipment 100 a request for withdrawal which is composed of the public key PKU as the user pseudonym and the user identification information IdU as the user real name, both read out of the storage device 310, and his requested amount of issue x which is entered via the input device 360.

Upon receiving the withdrawal request (PKU, IdU, x) from the user 300, the issuer equipment 100 sets an electronic cash balance counter in the storage device 110 in correspondence with the user public key PKU (corresponding to the user real name IdU) and increases its count value EBC (initialized at 0) by the balance updating device 190 by the amount x (EBC←EBC+x). At the same time, the issuer equipment 100 decreases, by the balance updating device 190, the balance ABC of a user's account, provided in the storage device 110 in correspondence with the user real name IdU, by the amount x (ABC←ABC+x). Further, issuer 100 generates generates an issuer signature SKI(PKU, x) by the signature generating device 130 with a secret key SKI for the amount x and the user public key PKU. The signature is sent to the user equipment 300.

The user equipment 300 verifies the validity of the signature SKI(PKU, x) by the signature verifying device 320 using a public key PKI. If the issuer signature is valid, the balance updating device 370 increments an electronic cash balance counter Balance set in the storage device 310 by x (Balance=+x).

A noteworthy feature of the withdrawal procedure in FIG. 3 lies in that the signature SKI(PKU, x) issued from the issuer equipment 100 to the user equipment 300 is not stored in the storage device 310 and hence is not used afterward unlike in the prior art. That is, the issuer signature SKI(PKU, x) is used only to inform the user of the increment of the electronic cash counter by the amount x and the decrement of the user balance counter by the amount x; the user acknowledges it and increments the balance counter Balance of the user equipment 300 by the amount x. This is one of the features of the present invention which are common to the embodiments described later on.

Another feature of the present invention resides in that electronic cash is managed for each user real name IdU (or pseudonym in the embodiments described later on) in the issuing equipment 100, and is merely managed as the electronic cash balance counter EBC. Besides, when the user requests the issuing equipment 100 for an additional issuance of electronic cash as required, the issuer 100 adds the current balance of the user electronic cash balance counter with the amount additionally issued, and subtracts from the user balance counter (account) the amount additionally issued. In the conventional electronic cash systems, however, electronic cash is managed for each piece of electronic cash issued, and a plurality of pieces of electronic cash issued to the same user are managed individually.

(3) Payment Procedure

A description will be given, with reference to FIG. 4, of the procedure for the payment of y yen from the user to the shop by electronic cash. The shop equipment 400 comprises a storage device 410, a signature verifying device 420, a random generating device 440 and a timing device 450. In the storage device 410 there are stored a real name IdS of the shop 400 and a public key PKR of the trustee 500.

Step 1: The user equipment 300 sends the user public key PKU as its pseudonym and the license SKR(PKU) to the shop equipment 400.

Step 2: The shop equipment 400 verifies the validity of the signature contained in the license SKR(PKU) by the signature verifying device 420 with the trustee public key PKR, and sends as a challenge to the user equipment 300 a set of information composed of a random number Rs and time information Ts generated by the random generating device 440 and the timing device 450, respectively, and the shop real name IdS.

Step S3: The user equipment 300 decrements the balance counter Balance in the storage device 310 by y (Balance=x−y), then generates, by the signature generating device 390 using the key SKU, a user signature SKU(y, IdS, Rs, Ts) for the challenge (Rs, Ts, IdS) and the amount due y, and sends the signature and the amount y to the shop equipment 400.

Step 4: The shop equipment 400 verifies the validity of the signature SKU(y, IdS, Rs, Ts) from the user equipment 300 by the signature verifying device 420 using the public key PKU, and stores as history information H in the storage device 410 all pieces of information {PKU, SKR(PKU), Ts, Rs, y, SKU(y, IdS, Rs, Ts)} sent to and received from the user equipment 300.

Figure 4:
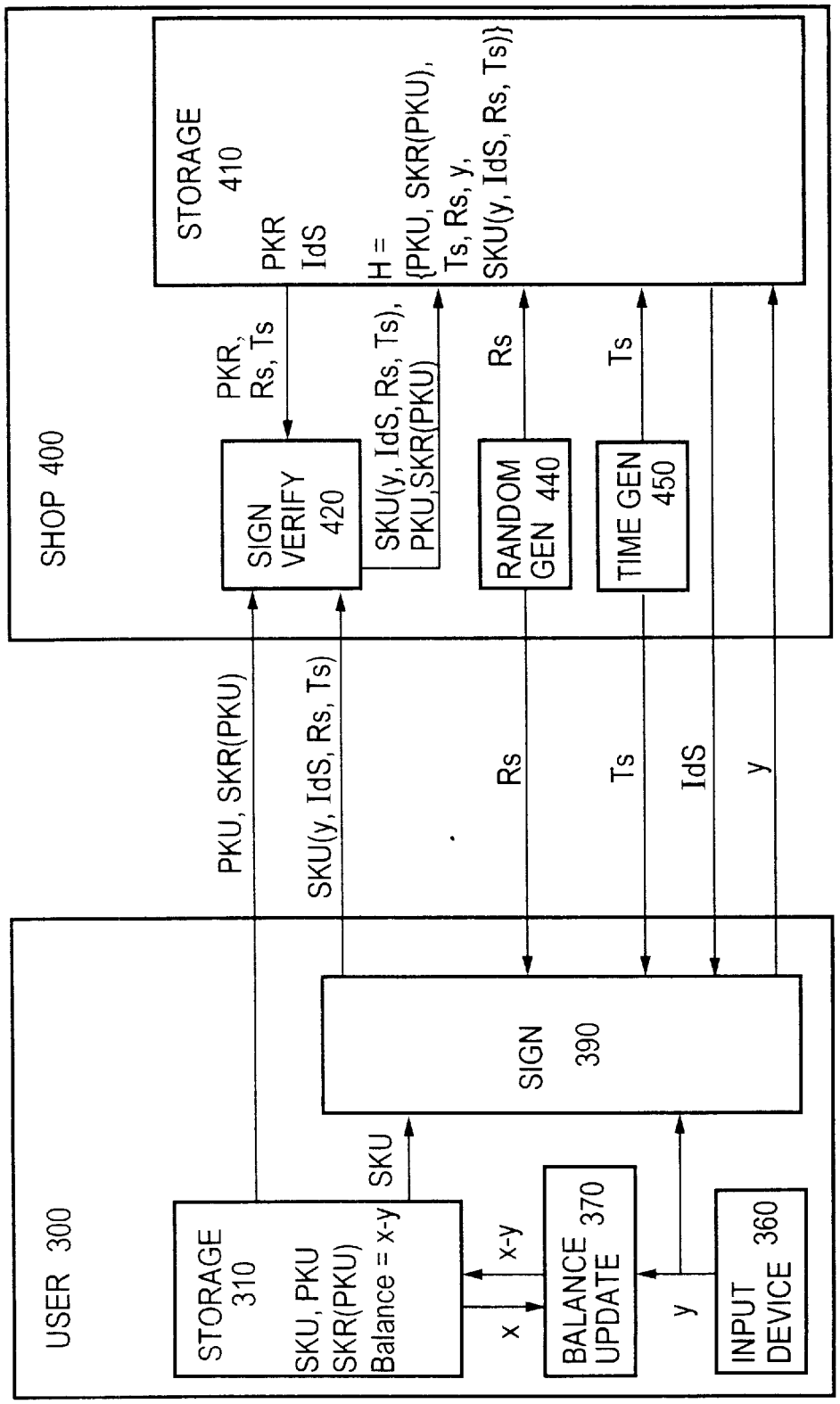
FIG. 4 is a block diagram depicting the functional configuration for a payment process according to the first embodiment.

A notable feature of the payment procedure in FIG. 4 is the absence of electronic cash that is issued from the issuing equipment 100; instead, the set of information composed of the license SKR (PKU), the user public key PKU and the user signature SKU(y, IdS, Rs, Ts) sent from the user 300 to the shop 400 correspond to electronic cash. That is, another feature of the present invention resides in that the electronic cash for payment is handled as guaranteeing the amount to be paid as long as it bears the license SKR(PKU) issued as the trustee signature for the user public key and the user signature; accordingly, the invention does not use the signature of the issuer (a bank, for instance) needed in the past.

(4) Deposit Procedure

A description will be given, with reference to FIG. 5, of the procedure for depositing the electronic cash paid to the shop in the issuing equipment 100. The issuing equipment 100 further comprises a balance updating device 190.

Step 1: The shop 400 sends the history information H={PKU, SKR(PKU), Ts, Rs, y, SKU(y, IdS, Rs, Ts)} and the its real name IdS to the issuer equipment 100.

Step 2: The issuer equipment 100 verifies the validity of the license SKR(PUK) and the user signature SKU(y, IdS, Rs, Ts) contained in the history information H, by the signature verifying device 120 using the trustee public key PKR and the user public key PKU, respectively. When the license and the user signature are both found valid, the issuer equipment 100 uses the balance updating device 190 to increase the balance in the account ABC of the shop 400 in the storage device 100 by y (IdS:ABC←ABC+y) and decrement the balance counter EBC for the user public key SKU by y (PK U:EBC←EBC−y), and stores the history information H in the storage device 110.

(5) Procedure To Cope With Improper Use or Attack

When the count value of the balance counter EBC for PKU becomes minus, the issuer equipment 100 specifies the attacker by retrieving the real name IdS corresponding to the public key PKU stored in the storage device 110.

Second Embodiment

In the first embodiment the issuing institution manages the electronic cash balance counter EBC registered under the user pseudonym as well as the account ABC of the user IdU, and hence it is in a position to learn the balance in the user account ABC and the usage of electronic cash. Additionally, since the issuing institution may also learn the shop where the user of the real name IdS spent electronic cash from the pseudonym PKU contained in the history H returned to the issuing institution from the shop IdS, there is the possibility of user privacy being infringed on. To ensure the protection of user privacy, the second embodiment of the present invention has a system configuration in which the function of managing the account of the user IdU and the function of managing the electronic cash balance counter corresponding to the pseudonym PKU are assigned to different institutions, in this example, a bank and an electronic cash issuing institution.

Figure 6:
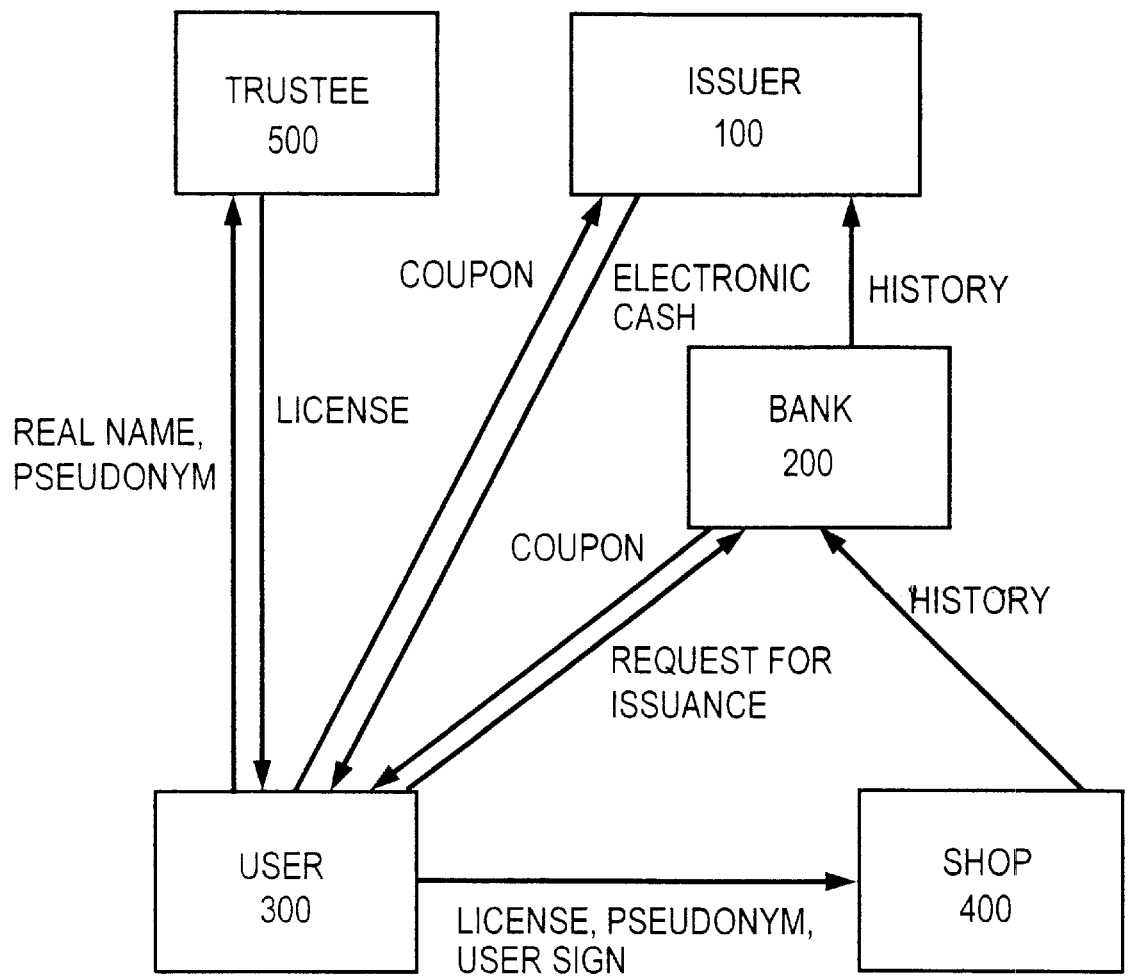
FIG. 6 is a block diagram illustrating the prime system constituents for a second embodiment of the present invention.

In FIG. 6 there is depicted the basic configuration of an electronic cash system according to the second embodiment. The issuer equipment 100, a bank equipment 200, the user equipment 300, the shop equipment 400 and the trustee equipment 500 are connected via communication lines, for instance, but they may be connected by smart cards or the like which are capable of recording thereon information.

In this embodiment, the electronic cash issuing institution 100 is provided separately of an institution which manages user accounts, such as the bank 200. As is the case with the first embodiment, the user registers the pseudonym corresponding to his real name with the trustee 500 and receives therefrom the license for the use of electronic cash. Next, in order for the user to have the issuing institution issue electronic cash, the former asks the bank 200 to issue a desired amount of money x, and the bank 200 responds to the request to subtract the amount x from the user account and send an electronic coupon ticket. The procedure for the payment of electronic cash to the shop 400 is the same as in the first embodiment. The shop 400 sends to the bank 200 a communication history in the payment procedure, and the bank 200 deposits into the account of the shop the amount paid thereto. This embodiment will be described below in detail.

(1) User Registration Procedure

Figure 7:
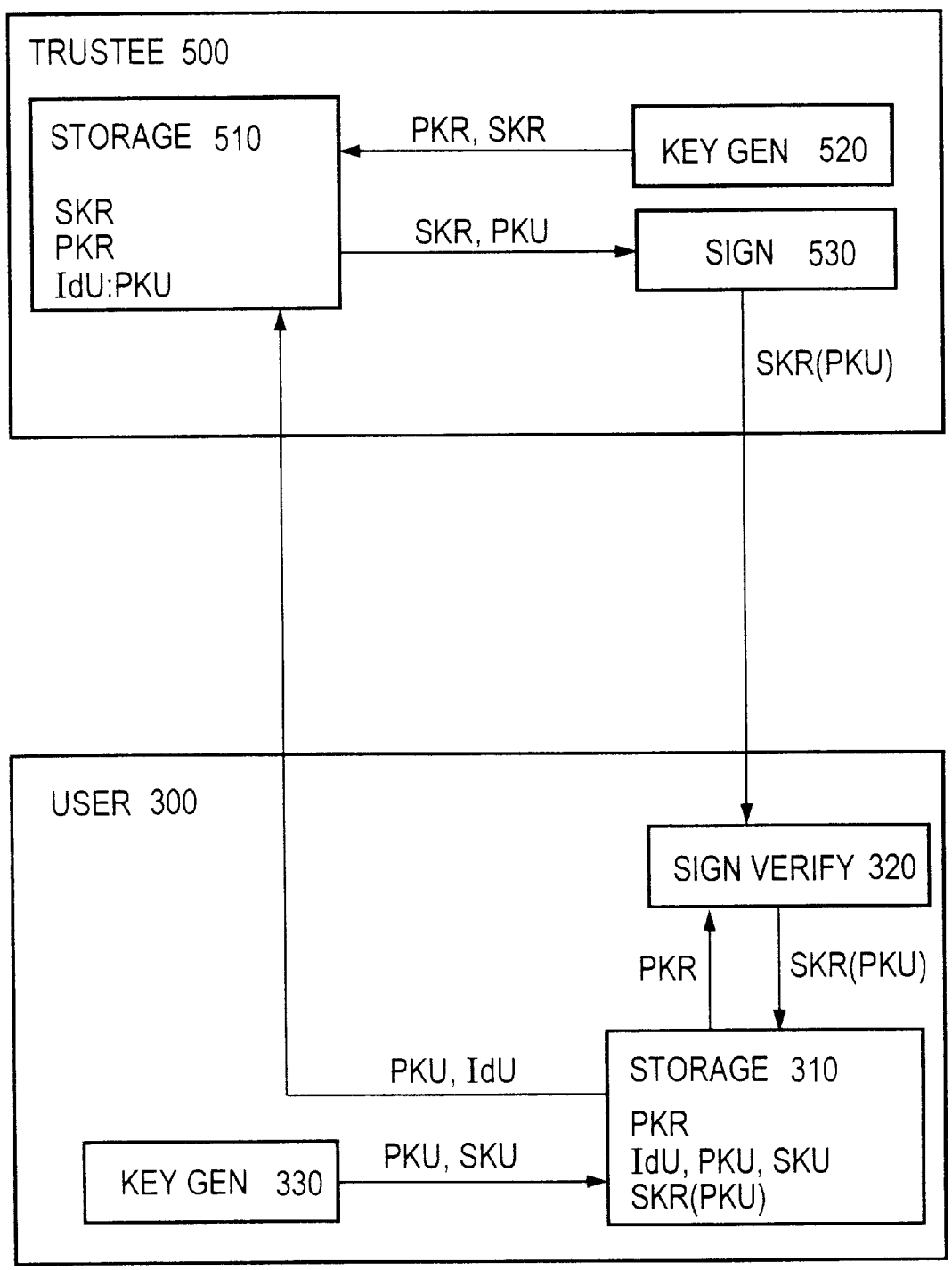
FIG. 7 is a block diagram depicting the functional configuration for a user registration process according to the second embodiment.

FIG. 7 illustrates in block form the user registration procedure. The trustee equipment 500 comprises, as in the first embodiment, a storage device 510, a key generating device 520 and a signature generating device 530, and generates a secret key SKR and a public key PKR by the key generating device 520. The public key PKR is prerevealed to the user equipment 300 and the shop equipment 400.

The user equipment 300 comprises, as in the first embodiment, a storage device 310, a signature verifying device 320 and a key generating device 30. The user equipment 300 generates a secret key SKU and a public key PKU by the key generating device 330 and stores them in the storage device 310 and, at the same time, sends the public key PKU and the user real name IdU as a request for user registration (a request for the issuance of a license) to the trustee equipment 500.

The trustee equipment 500 generates its signature (license) SKR(PKU) for the user public key (pseudonym) PKU by the signature generating device 530 using the key SKR, then stores the license in the storage deice 510 in correspondence with the key PKU and the real name IdU, and sends the license to the user equipment 300.

The user equipment 300 verifies the validity of the license SKR(PKU) by the signature verifying device 320, and stores the license in the storage device 310 when it is found valid.

(2) Withdrawal Procedure (Electronic Cash Issuing Procedure)

Figure 8:
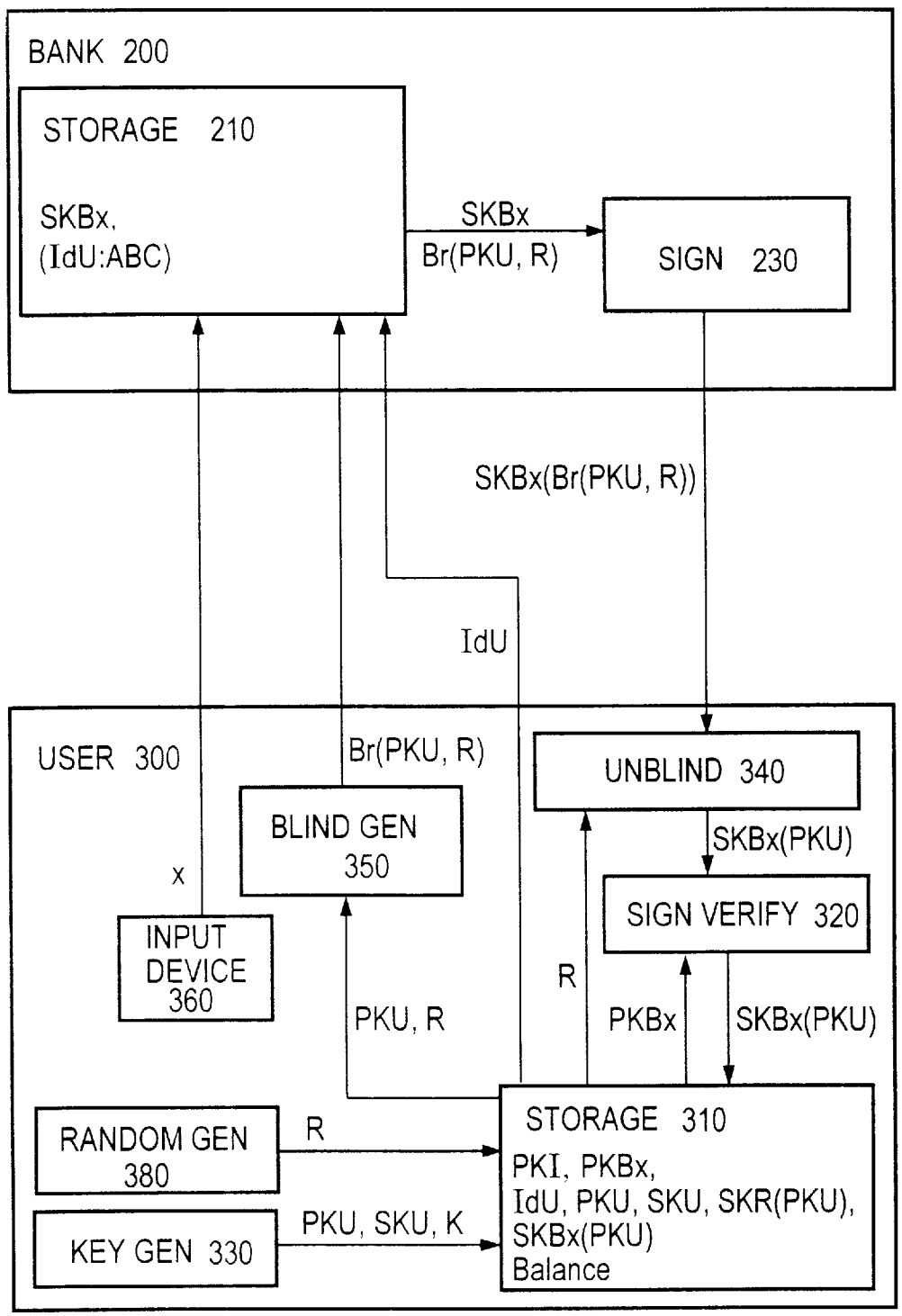
FIG. 8 is a block diagram depicting part of the functional configuration for a withdrawal process according to the second embodiment.
Figure 9:
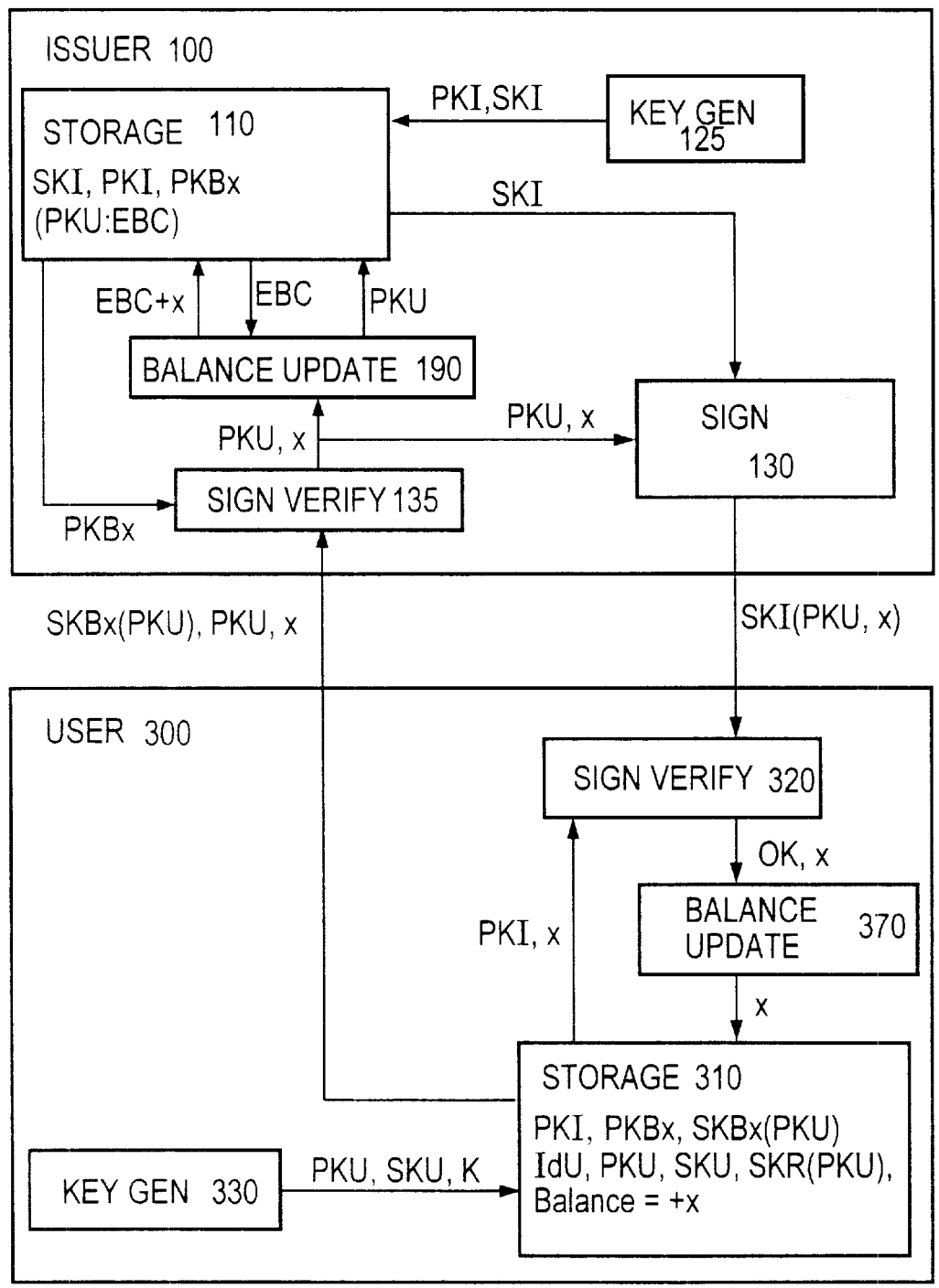
FIG. 9 is a block diagram depicting the other remaining configuration for the withdrawal process.

Now, a description will be given, with reference to FIGS. 8 and 9, of the procedure which the user 300, the bank 200 and the issuing institution 100 follow to issue electronic cash. The user equipment 300 further comprises an unblinding device 340, a blinding device 350, an input device 360, a random generating device 380 (FIG. 8) and a balance updating device 370 (FIG. 9). The bank equipment 200 has a storage device 210 and a signature generating device 230. In the storage device 210 of the bank equipment 200 there is stored a pregenerated secret key SKBx for electronic cash x, and a public key PKBx for electronic cash x is sent to the user equipment 300 and the issuing equipment 100 in advance. The user equipment 300 blinds or randomizes its public key PKU by the blinding device 35 with a random number R to generate blind information Br(PKU, R), and sends the information Br(PKU, R), the user real name IdU and the amount x to be withdrawn to the bank equipment 200.

The bank equipment 200 subtracts the amount x from the account ABC of the user real name IdU (IdU: ABC←ABC−x), and generates a signature SKBx(Br(PKU, R)) for the blind information Br(PKU, R) by the signature generating device 230 using the secret key SKBx for electronic cash x, and sends the signature SKBx(PKU, R) to the user equipment 300.

The user equipment 300 unblinds or derandomizes the signature SKBx(Br(PKU, R) by the unblinding device 340 with the random number R to obtain SKBx(PKU), then verifies its validity by the signature verifying device 320 with the public key PKBx, and if it is valid, stores SKBx (PKU) as an electronic coupon in the storage device 310.

Next, the user equipment 300 sends the coupon SKBx (PKU), the amount x and the user public key PKU as the pseudonym to the issuer equipment 100 as shown in FIG. 9. The issuer equipment 100 comprises a storage device 110, a key generating device 125, a signature generating device 130, a signature verifying device 135 and a balance updating device 190. A public key PKI and a secret key SKI are pregenerated by the key generating device 125 and are prestored in the storage device 110, and the public key PKI is provided to the user equipment 300 in advance.

Upon receiving the coupon SKBx(PKU), the user public key PKU and the amount withdrawn x from the user equipment 300, the issuer equipment 100 verifies the validity of the coupon SKBx(PKU) by the signature verifying device 135 with the public key PKBx for the amount x. If the coupon SKBx(PKU) is valid, a balance counter EBC set in the storage device 110 in correspondence with the pseudonym PKU is incremented by x by the balance updating device 190 (PKU: EBC←EBC+x). At the same time, an issuer signature SKI(PKU, x) for the amount x and the pseudonym PKU is generated by the signature generating device 130, and is sent to the user equipment 300.

The user equipment 300 verifies the validity of the issuer signature SKI(PKU, x) by the signature verifying device 320 with the public key PKI. If the signature is valid, an electronic cash balance counter balance set in the storage device 310 is incremented by x by the balance updating device 370 (Balance=+x).

(3) Payment Procedure

Figure 10:
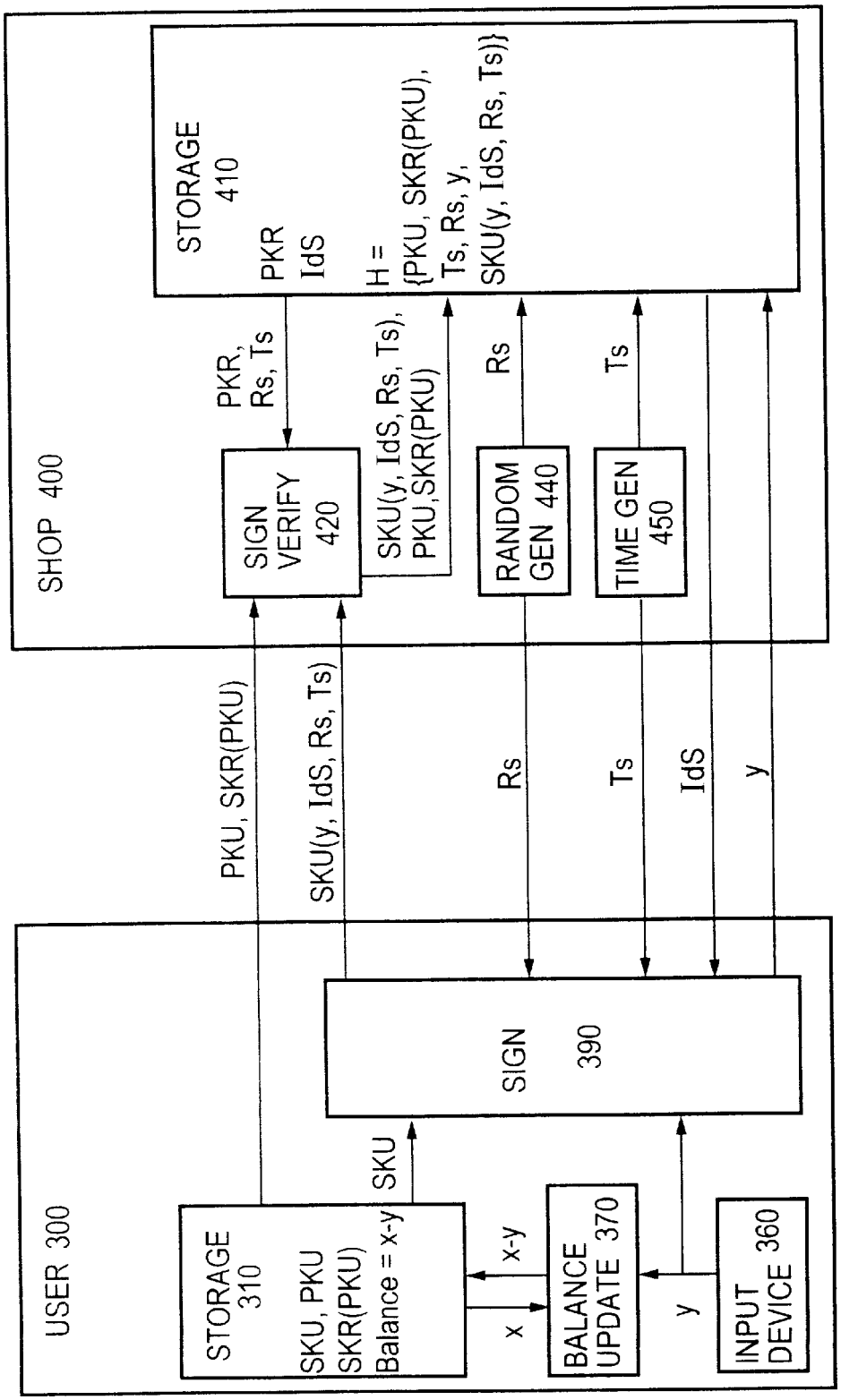
FIG. 10 is a block diagram depicting the functional configuration for a payment process according to the second embodiment.

A description will be given, with reference to FIG. 10, of the procedure for the payment of y yen from the user to the shop by electronic cash. The user equipment 300 further comprises a balance updating device 370, an input device 360 and a signature generating device 390. The shop 400 comprises a storage device 410, a signature verifying device 420, a random generating device 440 and a timing device 450.

Step 1: The user equipment 300 sends the user public key PKU as its pseudonym and the license SKR(PKU) to the shop equipment 400.

Step 2: The shop equipment 400 verifies the validity of the license SKR(PKU) by the signature verifying device 420 with the public key PKR, and sends as a challenge to the user equipment 300 a set of information composed of a shop real name IdS and a random number Rs and time information Ts generated by the random generating device 440 and the timing device 450, respectively.

Step S3: The user equipment 300 decrements the balance counter Balance in the storage device 310 by y (Balance= x−y) by the balance updating device 370, then generates, by the signature generating device 390, a user signature SKU(y, IdS, Rs, Ts) for the challenge (Rs, Ts, IdS) and the amount due y, and sends the signature and the amount due y to the shop equipment 400.

Step 4: The shop equipment 400 verifies the validity of the signature SKU(y, IdS, Rs, Ts) from the user equipment 300 by the signature verifying device 420. If the signature is found valid, then the shop equipment 400 regards the payment as a valid payment by electronic cash, and stores as history information H in the storage device 410 all pieces of information {PKU, SKR(PKU), Ts, Rs, y, SKU(y, IdS, Rs, Ts)} exchanged between the shop equipment 400 and the user equipment 300.

(4) Deposit Procedure

Figure 11:
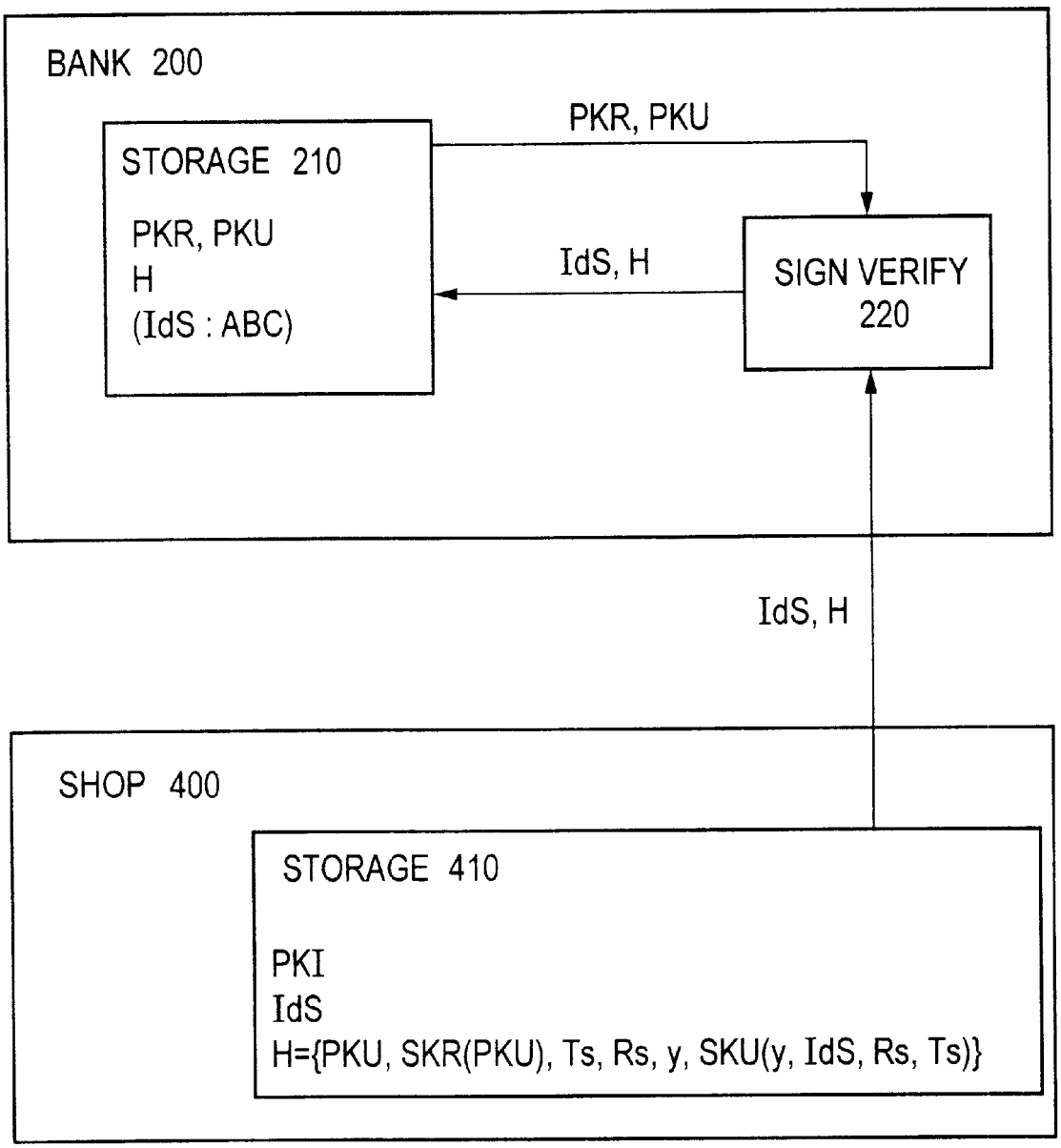
FIG. 11 is a block diagram depicting the functional configuration for a deposit process according to the second embodiment.

A description will be given, with reference to FIG. 11, of the procedure for the shop equipment 400 to deposit its received electronic cash in the bank equipment 200. The bank equipment 200 further comprises a signature verifying device 220.

Step 1: The shop 400 sends the history information H and the shop real name IdS to the bank equipment 200.

Step 2: The bank equipment 200 verifies the validity of the license SKR(PUK) and the user signature SKU(y, IdS, Rs, Ts) contained in the history information H, by the signature verifying device 220 with the trustee public key PKR and the user public key PKU, respectively. When the license and the user signature are found valid, the bank equipment 200 increases the balance of the account ABC of the shop 400 by y (IdS:ABC←ABC+y), and stores the history information H in the storage device 210.

(5) Return Procedure

Figure 12:
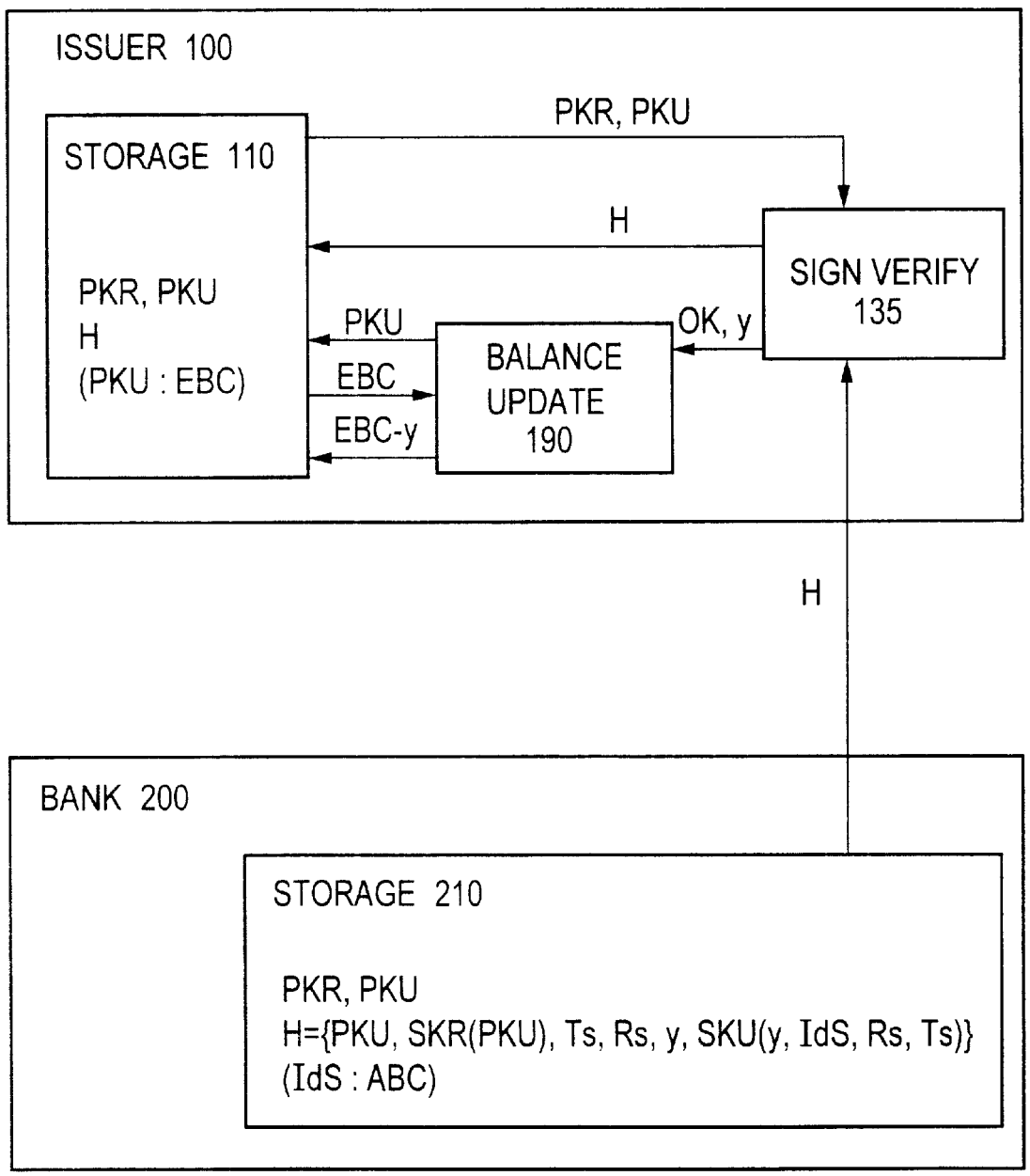
FIG. 12 is a block diagram depicting the functional configuration for an electronic cash return process according to the second embodiment.

Referring next to FIG. 12, the procedure for the return of electronic cash from the bank equipment 200 to the issuer equipment 100 will be described below. The issuer equipment 100 further comprises a balance updating device 190.

Step 1: The bank equipment 200 sends the history information H to the issuer equipment 100.

Step 2: The issuer equipment 100 verifies the validity of the license and the user signature contained in the history information H by the signature verifying device 135 with the public keys PKR and PKU. If the license and the user signature are found valid, the electronic cash balance counter EBC corresponding to the user public key PKU in the storage device 110 is decremented by y (PKU: EBC←EBC−y) by the balance updating device 190, and the history information H is stored in the storage device 110.

(6) Procedure to Cope with Attack

When it is found in the issuer equipment 100 that the count value of the balance counter EBC for PKU is minus, the issuer equipment 100 sends to the trustee equipment 500 the public key PKU stored in the storage device 110. The trustee equipment 500 (FIG. 7) retrieves the user real name IdU corresponding to the public key PKU in the storage device 510 to thereby specify the attacker.

Third Embodiment

The second embodiment described above permits the protection of user privacy, but inevitably involves a complex procedure for the issuance of electronic cash because the pseudonym registration institution and the electronic cash issuing institution are independent of each other. To obviate this defect, this embodiment has a system configuration which protects user privacy and uses the same institution, in this example, the electronic cash issuing institution, for both of the registration of pseudonym and the issuance of electronic cash, thereby permitting simplification of the electronic cash issuing procedure.

Figure 13:
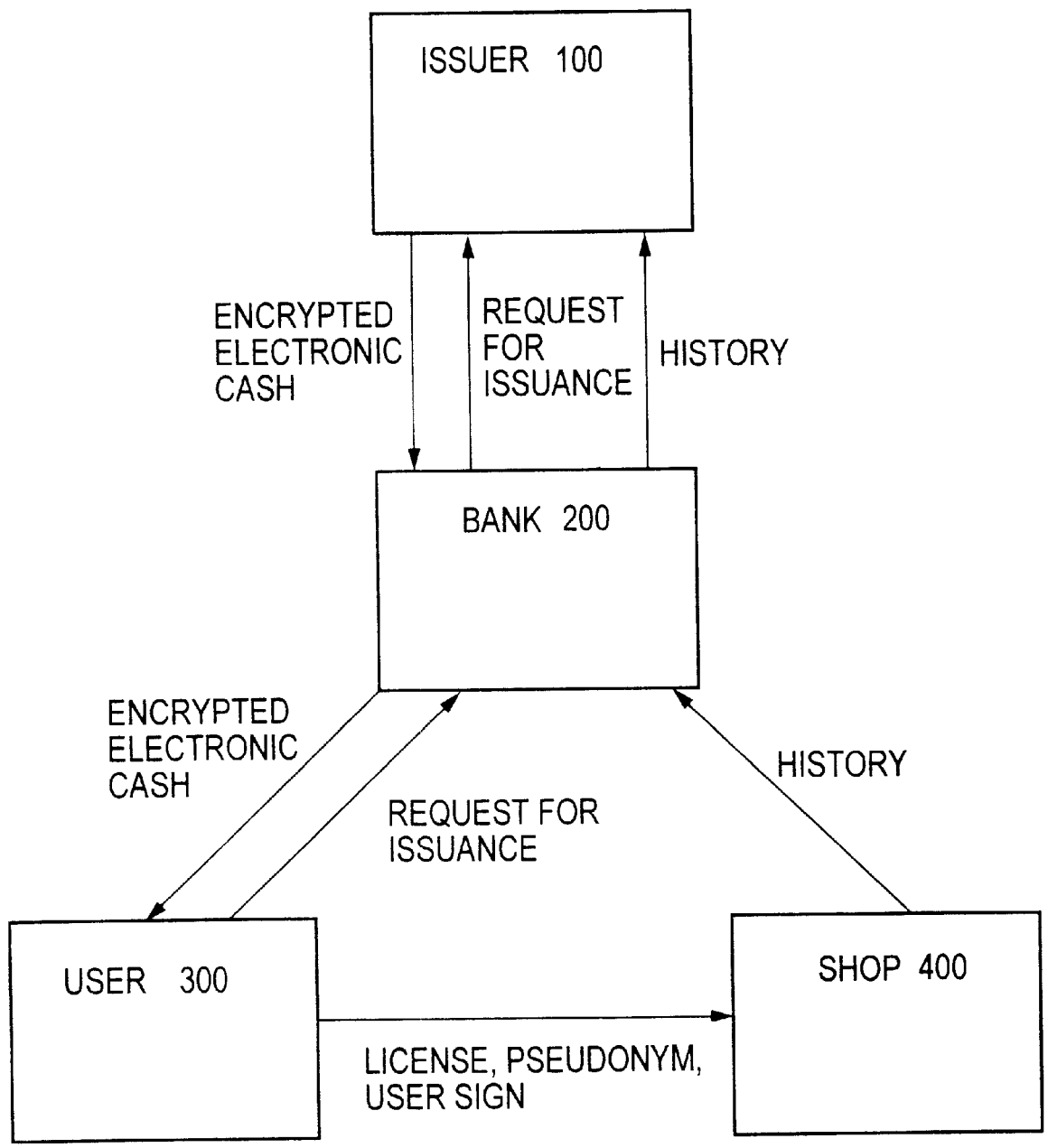
FIG. 13 s a block diagram illustrating the prime system constituents for a third embodiment of the present invention.

FIG. 13 illustrates in block form the basic configuration of an electronic cash system according to the third embodiment.

The issuer equipment 100, the bank equipment 200, the user equipment 300 and the shop equipment 400 are connected, for example, via communication lines, but they may also be connected using smart cards or the like capable of recording thereon information. In this embodiment, no trustee is employed but instead the issuing institution 100 issues electronic cash as well as a license. The user 300 sends to the bank 200 a request for the registration for the use of electronic cash. The bank 200 sends to the issuing institution 100 a request for the registration for the use of electronic cash. The issuing institution 100 encrypts the license for the user 300 to conceal it from the bank 200, and sends the encrypted license to the user 300 via the bank 200. The user 300 sends to the bank 200 a request for the issuance of electronic cash. The bank 200 draws from the account of the user 300 the amount requested to issue, and sends the request for the issuance of electronic cash to the issuing institution 100. The issuing institution 100 encrypts electronic cash in the requested amount to conceal it from the bank 200, and sends the encrypted electronic cash to the user 300 via the bank 200. The procedure for the payment to the shop 400 by electronic cash and the procedure for the shop 400 to deposit the electronic cash paid thereto in the bank 200 are the same as in the second embodiment. The third embodiment will be described below in detail.

(1) User Registration Procedure

Figure 14:
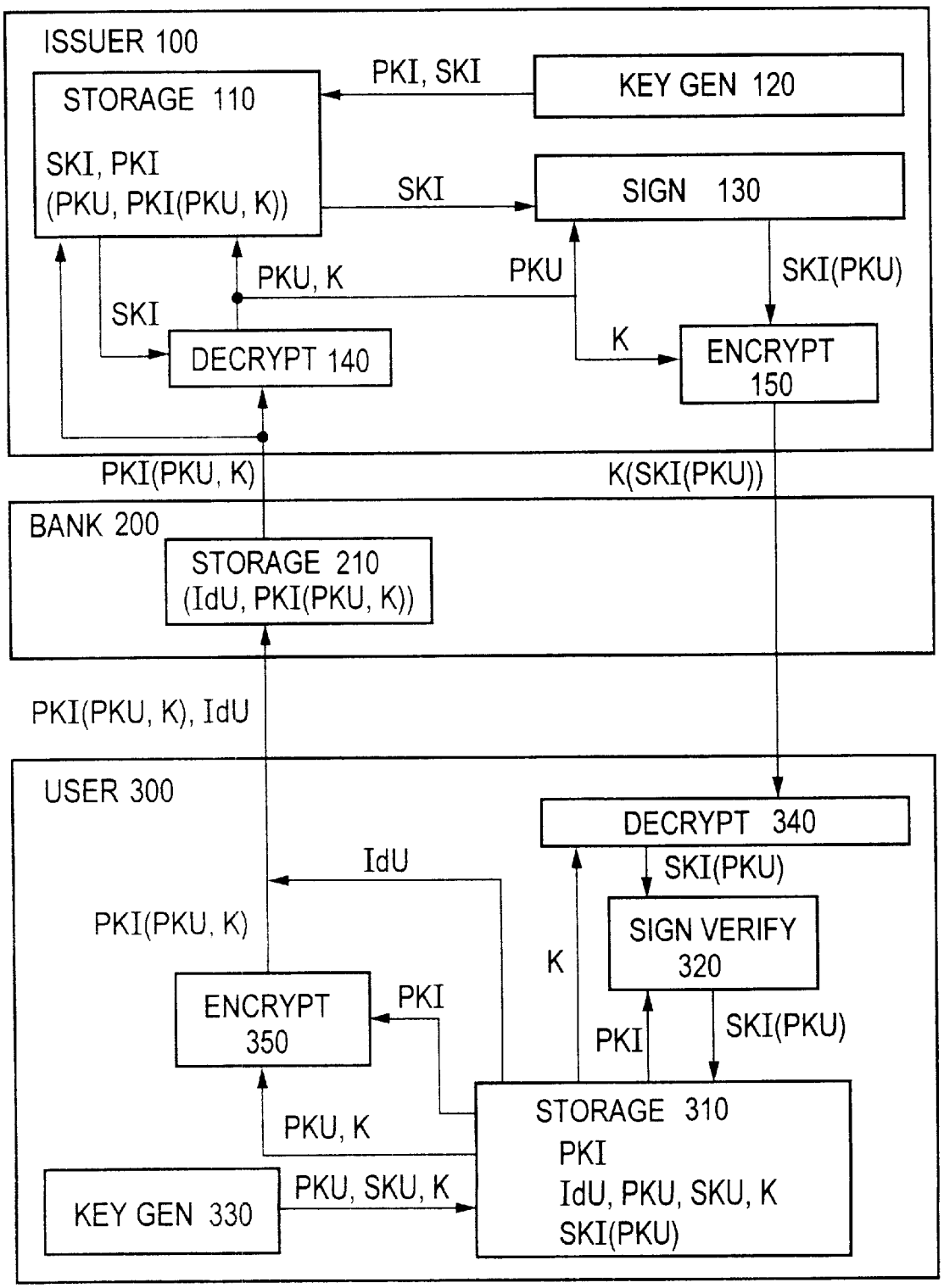
FIG. 14 a block diagram depicting the functional configuration for a user registration process according to the third embodiment.

FIG. 14 is a diagrammatic showing of the user registration procedure.

The electronic cash issuing equipment 100 comprises a storage device 110, a key generating device 120, a signature generating device 130, a decrypting device 140 and an encrypting device 150. The issuer equipment 100 generates a secret key SKI and a public key PKI by the key generating device 120, and prestores them in the storage device 110, the public key PKI being prerevealed to the user equipment 300 and the shop equipment 400.

The user equipment 300 comprises a storage device 310, a signature generating device 320, a key generating device 330, a decrypting device 340 and an encrypting device 350. The user equipment 300 generates a secret key SKU, a public key PKU and a common K by the key generating device 330, and stores them in the storage device 310. At the same time, the user equipment 300 encrypts the public key PKU and the common key K by the encrypting device 350 with the use of the issuer public key PKI so as to conceal them from the bank 200, and sends the encrypted key PKI(PKU, K) and the user real name IdS, as a request for registration for the use of electronic cash, to the bank equipment 200.

The bank equipment 200 stores the received real name IdU and key PKI(PKU, K) in the storage device 210 in correspondence with each other, and sends the key PKI (PKU, K) intact as a request for registration for the use of electronic cash to the issuer equipment 100.

The issuer equipment 100 decrypts the key PKI(PKU, K) by the decrypting device 140 with the secret key SKI to extract the keys PKU and K, and stores the encrypted key PKI(PKU, K) and the user public key PKU in the storage device 110. Further, the issuer equipment 100 generates its signature (that is, a license) SKI(PKU) for the public key PKU by the signature generating device 130 with the secret key SKI, and encrypts the license by the encrypting device 150 with the common key K from the user 300 to obtain an encrypted license K(SKI(PKU)), which is sent to the bank equipment 200.

The bank equipment 200 sends the encrypted license K(SKI (PKU)) to the user equipment 300. The user equipment 300 decrypts the encrypted license K(SKI(PKU)) by the decrypting device 340 with the common key K to extract the license SKI(PKU), then verifies its validity by the signature verifying device 320 with the public key PKI, and if valid, stores it in the storage device 310.

(2) Withdrawal Procedure (Electronic Cash Issuing Procedure)

A description will be given, with reference to FIG. 15, of the electronic cash issuing procedure which is carried out by the user equipment 300, the bank equipment 200 and the issuer equipment 100.

The user equipment 300 further comprises an input device 360 and a balance updating device 370. The public key PKU, the common key K and the requested amount of issue x, entered via the input device 36, are encrypted by the encrypting device 350 with the issuer public key PKI to obtain PKI(PKU, x, K), which is sent as a request for the issue of electronic cash to the bank equipment 200 together with the user real name IdU and the requested amount x. The bank equipment 200 draws the amount x from the account ABC corresponding to the user real name IdU, and sends PKI(PKU, x, K) and x to the issuer equipment 100.

The issuer equipment 100 further comprises a comparing device 180 and a balance updating device 190. The received information PKI(PKU, x, K) is decrypted by the decrypting device 140 with the secret key SKI to extract PKU, x and K, and the amount x received from the bank equipment 200 and the amount x extracted by the decryption are compared by the comparing device 180 to see if they match. If they match, the electronic cash balance counter EBC (initialized at 0) corresponding to the user public key PKU is incremented by x (EBC←EBX+x) by the balance updating device 190, then an issuer signature SKI(PKU, x) for the amount x and the public key PKU is generated by the signature generating device 130 with the key SKI, and the signature SKI(PKU, X) is encrypted by the encrypting device 150 with the user common key K to obtained an encrypted signature K(SKI (PKU, X)), which is sent to the bank equipment 200.

The bank equipment 200 sends the encrypted signature K(SKU (PKU, x)) to the user equipment 300. The user equipment 300 decrypts the encrypted signature K(SKI (PKU, X)) by the decrypting device 340 with the common key K to extract the issuer signature SKI(PKU, x), then verifies its validity by the signature verifying device 320 with the public key PKI, and if valid, increments the balance counter Balance in the storage device 310 by x.

(3) Payment Procedure (Electronic Cash Issuing Procedure)

A description will be given, with reference to FIG. 16, of the procedure for the payment of y yen from the user 300 to the shop 400 by electronic cash. The shop equipment 400 is common to the second embodiment of FIG. 10 in the provision of a storage device 410, a signature verifying device 420, a random generating device 440 and a timing device 450, but differs in the use of the issuer public key PKI as a public key for license verification.

Step 1: The user equipment 300 sends the user public key (pseudonym) PKU and the license SKI(PKU) to the shop equipment 400.

Step 2: The shop equipment 400 verifies the validity of the license SKI(PKU) by the signature verifying device 420 with the issuer public key PKI, and if valid, sends as a challenge to the user equipment 300 a set of information composed of a shop real name IdS and a random number Rs and time information Ts generated by the random generating device 440 and the timing device 450, respectively.

Step S3: The user equipment 300 enters the amount due y via the input device 360, decrements the balance counter Balance in the storage device 310 by y by the balance updating device 370, then generates, by the signature generating device 390, a user signature SKU(y, IdS, Rs, Ts) for the challenge (Rs, Ts, IdS) and the amount due y, and sends the signature and the amount y to the shop equipment 400.

Step 4: The shop equipment 400 verifies the validity of the signature SKU(y, IdS, Rs, Ts) from the user equipment 300 by the signature verifying device 420. If the signature is found valid, then the shop equipment 400 regards the payment in the amount y as an authorized or valid payment by electronic cash, and stores as history information H in the storage device 410 all pieces of information {PKU, SKI (PKU), Ts, Rs, y, SKU(y, IdS, Rs, Ts)} exchanged between the shop equipment 400 and the user equipment 300.

(4) Deposit Procedure

Figure 17:
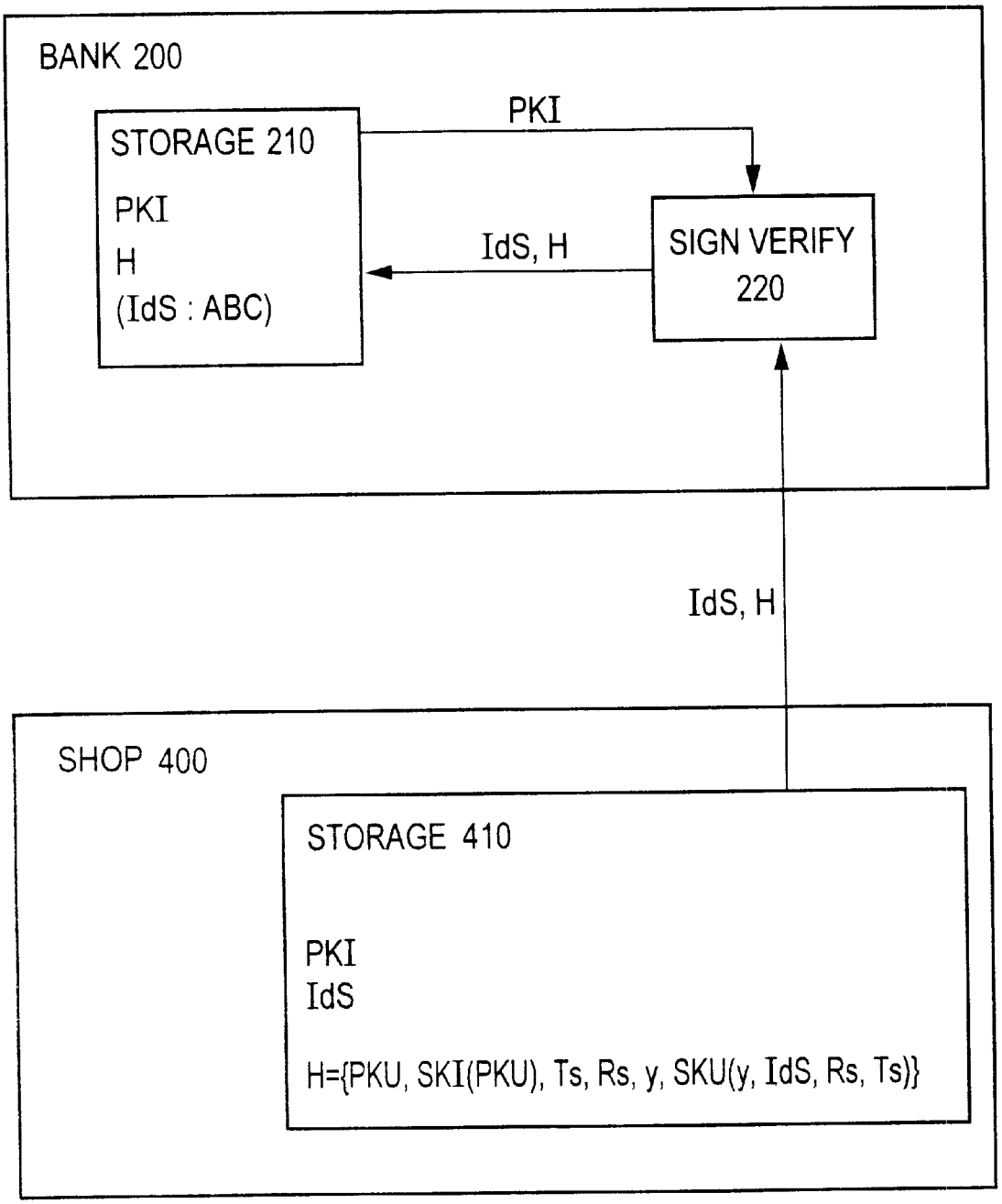
FIG. 17 is a block diagram depicting the functional configuration for a deposit process according to the third embodiment.

A description will be given, with reference to FIG. 17, of the procedure for the shop equipment 400 to deposit its received electronic cash in the bank equipment 200. The bank equipment 200 further comprises a signature verifying device 220.

Step 1: The shop 400 sends the history information H and the shop real name IdS to the bank equipment 200.

Step 2: The bank equipment 200 verifies the validity of the license SKI(PUK) and the user signature SKU(y, IdS, Rs, Ts) contained in the history information H, by the signature verifying device 220 using the issuer public key PKI and the user public key PKU, respectively. When the license and the user signature are found valid, the bank equipment 200 increases the balance of the account IdS:ABC of the shop 400 by y (ABC←ABC+y), and stores the history information H in the storage device 210.

(5) Return Procedure

Figure 18:
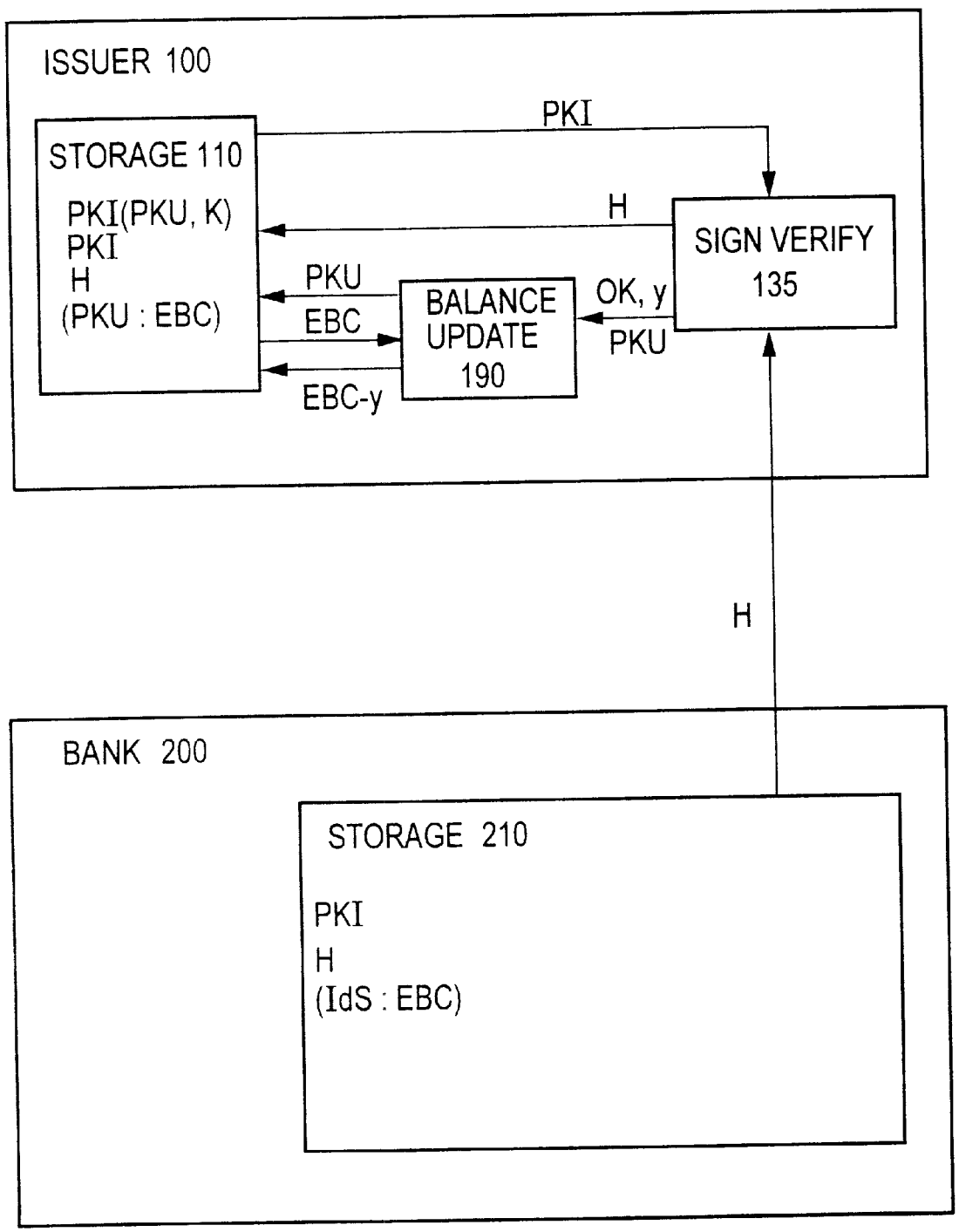
FIG. 18 is a block diagram depicting the functional configuration for an electronic cash return process according to the third embodiment.

Referring next to FIG. 18, the procedure for the return of electronic cash from the bank equipment 200 to the issuer equipment 100 will be described below. The issuer equipment 100 further comprises a signature verifying device 135 and a balance updating device 190.

Step 1: The bank equipment 200 sends the history information H to the issuer equipment 100.

Step 2: The issuer equipment 100 verifies the validity of the license signature SKI(PKU) and the user signature SKU(y, IdS, Rs, Ts) contained in the history information H by the signature verifying device 135 using the public keys PKI and PKU, respectively. If the both signatures are found valid, the electronic cash balance counter EBC corresponding to the pseudonym PKU in the storage device 110 is decremented by y (PKU: EBC←EBC−y) by the balance updating device 190, and the history information H is stored in the storage device 110.

(6) Procedure to Cope with Attack

When it is found in the issuer equipment 100 that the count value of the balance counter EBC corresponding to the pseudonym PKU is minus, the issuer equipment 100 retrieves PKI(PKU, K) based on the pseudonym PKU stored in the storage device 110, and sends PKI(PKU, K) to the bank equipment 200. The bank equipment 200 retrieves the user real name IdU based on PKI(PKU, K) to thereby specify the attacker.

Fourth Embodiment

The electronic cash system according to this embodiment is identical in configuration with that depicted in FIG. 13. According to the above-described third embodiment intended to ensure the protection of user privacy from the bank 200, in either of the procedures for the registration of the user for use of electronic cash (FIG. 14) and for the issuance of electronic cash (that is, the withdrawal procedure) (FIG. 15), the user's generated common key K and public key PKU are encrypted using the issuer public key PKI and sent to the issuer equipment 100 via the bank equipment 200, and the issuer equipment 100 decrypts the common key K from the encrypted key K, and uses the decrypted common key K to encrypt the signature that is sent to the user equipment 300. This fourth embodiment is common to the third embodiment in that the user sends the common ky after encrypting it with the issuer public key PKI in the user registration procedure, but differs in that the issuer stores its decrypted user common key in the storage device in correspondence with the user so that when the user makes a request for the issuance of electronic cash, it can encrypt its public key PKU and the amount of money x with the common key K instead of using the issuer public key PKI.

(1) Registration Procedure (License Issuing Procedure)

Figure 19:
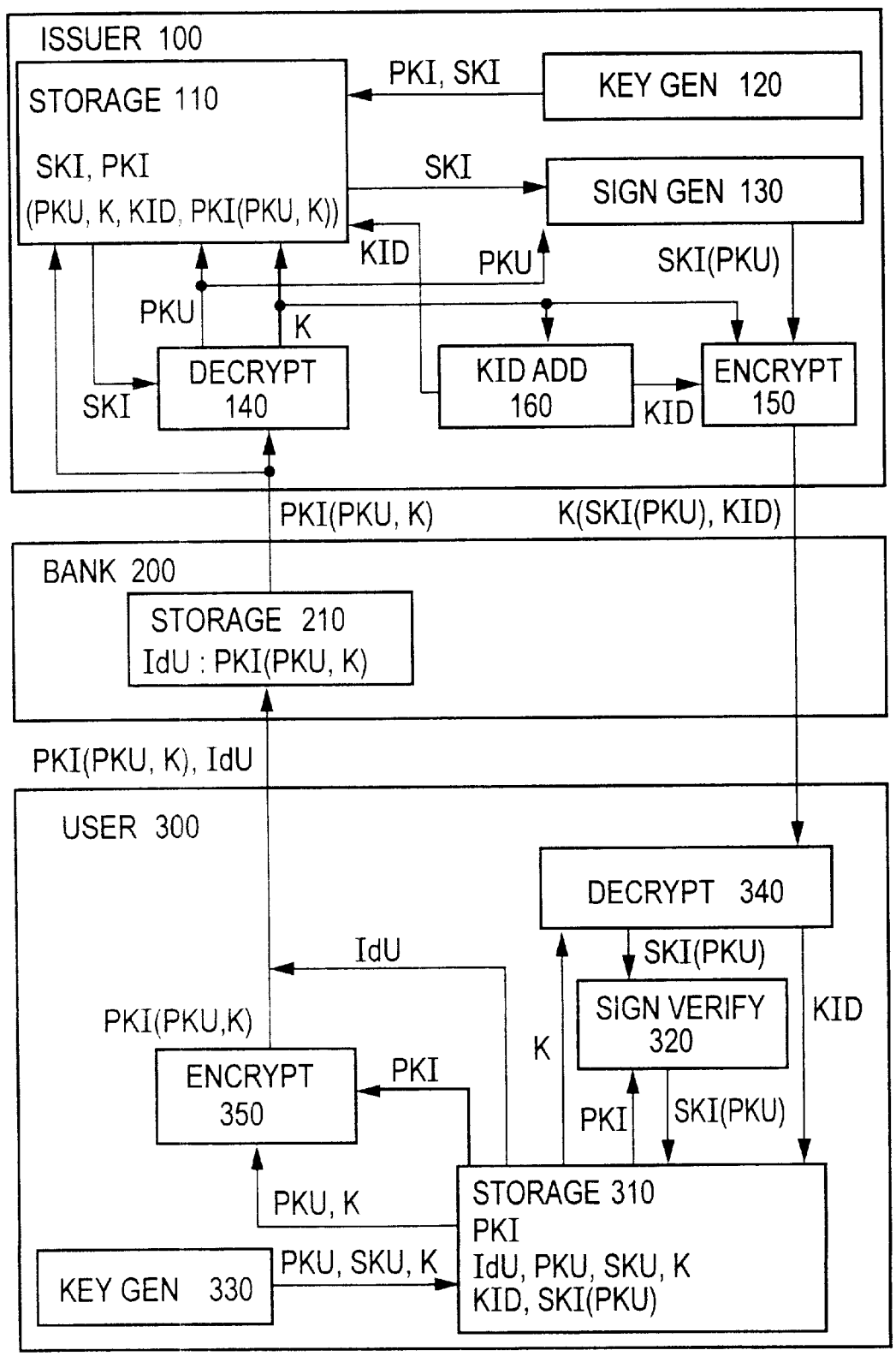
FIG. 19 is a block diagram depicting the functional configuration for a user registration process according to a fourth embodiment.

As depicted in FIG. 19, the issuer equipment 100 has a KID adding device in addition to the configuration used in the third embodiment of FIG. 14. As is the case with the third embodiment, the issuer equipment 100 generates the secret key SKI and public key PKI by the key generating device 120, and sends the public key PKI to the user equipment 300 and the shop equipment 400 in advance.

The user equipment 300 also has the same construction as in the third embodiment of FIG. 14. That is, the user equipment 300 generates the secret key SKU, the public key PKU and the common key K by the key generating device 330, then stores them in the storage device 310 and, at the same time, encrypts the public key PKU as the pseudonym to be registered and the common key K by the encrypting device 350 with the issuer public key PKI to obtain PKI (PKU, K). The thus encrypted information PKI(PKU, K) and the user real name IdU are sent as a request for registration for the use of electronic cash to the bank equipment 200.

The bank equipment 200 stores the user real name IdU and the encrypted information PKI(PKU, K) in the storage device 210 in correspondence with each other, and sends the information PKI(PKU, K) as a request for registration to the issuer equipment 100.

The issuer equipment 100 decrypts the received information PKI(PKU, K) by the decrypting device 140 with the secret key SKI to extract the pseudonym PKU and the common key K, and generates the issuer signature (license) SKI(PKU) for the pseudonym PKU by the signature generating device 130. The above-described processes by the user equipment 300, the bank equipment 200 and the issuer equipment 100 are the same as in the third embodiment of FIG. 14. Thereafter, in this embodiment the issuer equipment 100 adds the common key K with an identification number ID (hereinafter referred to as key information KID) by the KID adding device 160, then stores PKI(PKU, K), PKU, K and KID in the storage device 110, and encrypts the license SKI(PKU) and the key information KID by the encrypting device 150 with the common key K to obtain an encrypted license K(SKI(PKU), KID), which is sent to the bank equipment 200.

The bank equipment 200 sends the encrypted license K(SKI (PKU), KID) to the user equipment 300. The user equipment 300 decrypts the encrypted license K(SKI(PKU), KID) by the decrypting device 340 with the common key K to extract the license SKI(PKU) and the key information KID, then verifies the validity of the license with the public key PKI, and if valid, stores the license SKI(PKU) and the key information KID in the storage device 310.

(2) Withdrawal Procedure

A description will be given, with reference to FIG. 20, of the withdrawal procedure which is carried out by the user, the bank and the issuing institution.

The user equipment 300 encrypts the user public key PKU and its requested amount of issue x, by the encrypting device 160 with the common key K to obtain an encrypted key K(PKU, x), and sends to the bank equipment 200 a set of information K(PKU, x), IdU, x and KID as the request for the issuance of electronic cash.

The bank equipment 200 draws the amount x from the account ABC corresponding to the user real name IdU, and sends the key K(PKU, x), the amount x and the key information KID to the issuer equipment 100. The issuer equipment 100 further comprises a retrieving device 170. The issuer equipment 100 retrieves the common key K corresponding to the key information KID from the storage device 110 by the retrieving device 170, and decrypts the key K(PKU, x) by the decrypting device 140 with the common key K, thereby extracting the user public key PKU and the amount x. The thus decrypted amount x is compared by the comparing device 180 with the amount x received from the bank equipment 200 to see if a match exists between them. If they match, issuer equipment 100 increments the balance counter EBC corresponding to the key PKU in the storage device 110 by x by the balance updating device 190, then generates an issuer signature SKI(PKU, x) corresponding to the amount x and the key PKU by the signature generating device 130, and encrypts the signature PKI(PKU, x) by the encrypting device 150 with the common key K to obtain an encrypted signature K(SKI, (PKU, x)), which is sent to the bank equipment 200.

The bank equipment 200 sends the encrypted signature K(SKI (PKU, x) to the user equipment 300. The user equipment 300 decrypts the encrypted signature K(PKI (PKU, x)) by the decrypting device 340 with the common key K to extract the original issuer signature SKI(PKU, x), then verifies the validity of the signature by the signature verifying device 320, and if valid, increments the balance counter Balance by x.

The payment procedure, the deposit procedure, the return procedure and the procedure to cope with an attack are the same as those in the third embodiment, and hence they will not be described.

Fifth Embodiment

The basic system configuration of this embodiment is identical with that depicted in FIG. 13.

(1) User Registration Procedure

Figure 21:
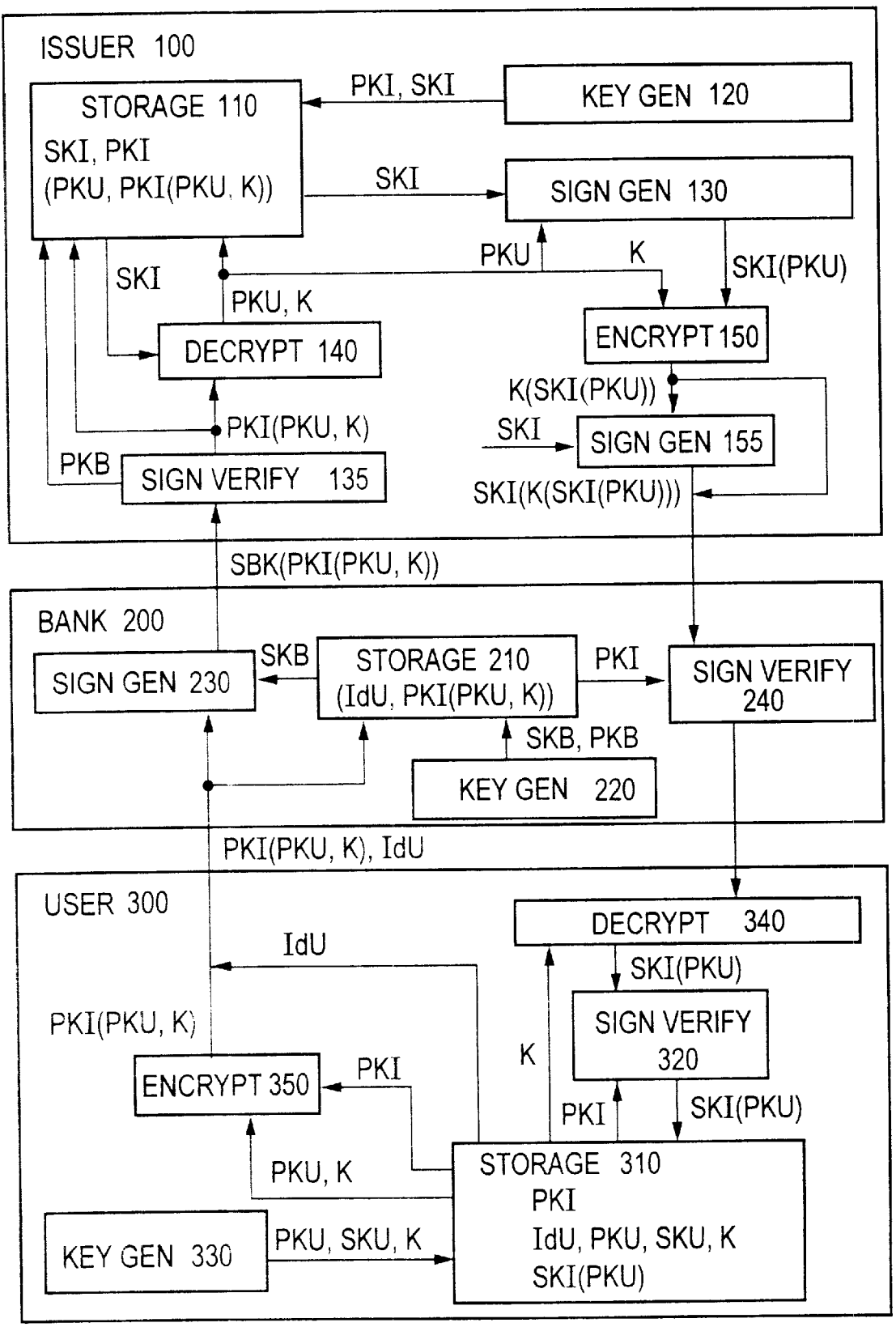
FIG. 21 is a block diagram depicting the functional configuration for a user registration process according to a fifth embodiment.

For the user registration procedure, as shown in FIG. 21, the bank equipment 200 has a key generating device 220 in addition to the device used in the third embodiment (FIG. 14). The bank equipment 200 generates a signature generating key SKB and a signature verifying key PKB by the key generating device 220, then sends the latter PKB to the issuer equipment 100 in advance, and prestores the keys SKB and PKB in the storage device 210. The bank equipment 200 further comprises a signature generating device 230, which generates a bank signature SKB(PKI(PKU, K)) corresponding to PKI(PKU, K), and the bank signature SKB(PKI(PKU, K)) is sent to the issuer equipment 100.

The issuer equipment 100 has a signature verifying device 135, which verifies the validity of the bank signature SKB (PKI(PKU, K)) with the key PKB. If the bank signature is valid, the issuer equipment 100 performs the same processing as in the third embodiment. That is, the issuer equipment 100 generates K(SKI (PKU)), then generates an issuer signature SKI(K(SKI(PKU))) for K(SKI(PKU)), and sends both of them to the bank equipment 200.

The bank equipment 200 further comprises a signature verifying device 240. The issuer public key PKI is made public in advance and is prestored in the storage device 210. The bank equipment 200 verifies the validity of the signature SKI(K(SKI (PKU))) from the issuer equipment 100 with the public key PKI, and if valid, performs the same processing as in the third embodiment.

(2) Withdrawal Procedure

Figure 15:
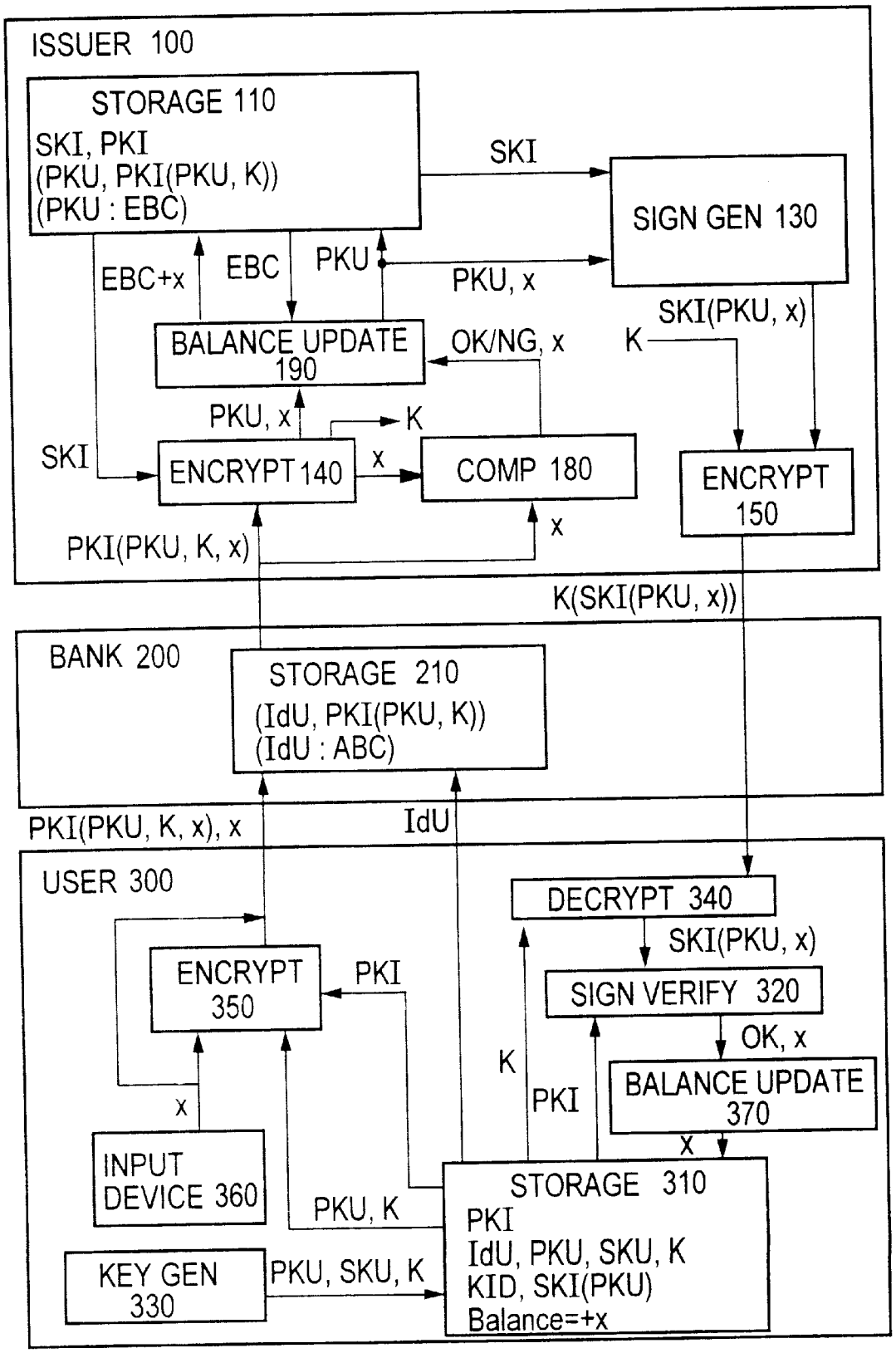
FIG. 15 is a block diagram depicting the functional configuration for a withdrawal process according to the third embodiment.
Figure 22:
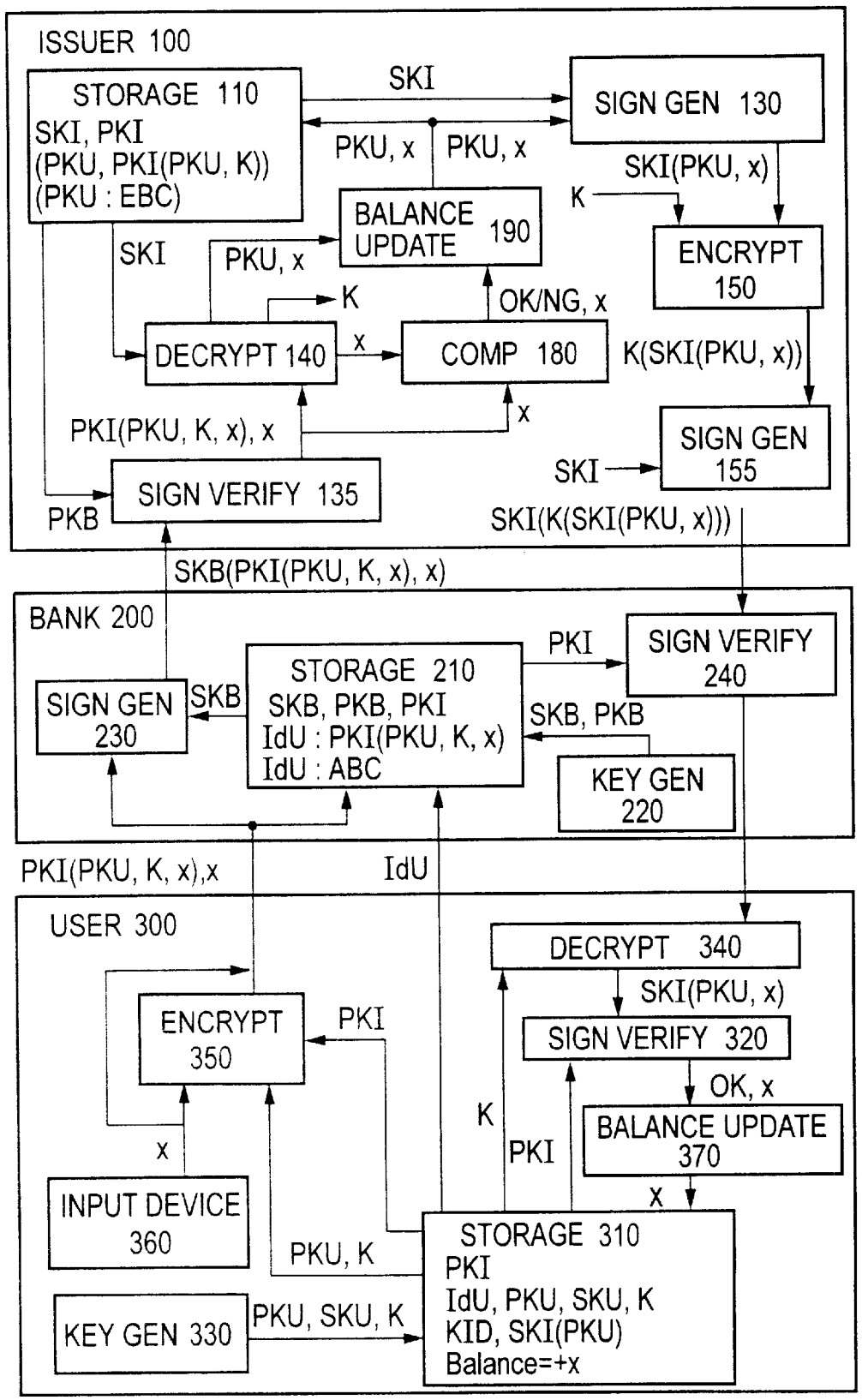
FIG. 22 is a block diagram depicting the functional configuration for a withdrawal process according to the fifth embodiment.

For the withdrawal procedure, as depicted in FIG. 22, the bank equipment 200 has a key generating device 220 in addition to the storage device 210 shown in FIG. 15. The bank equipment 200 generates a signature generating key SKB and a signature verifying key PKB by the key generating device 220, then prestores them in the storage device 210, and at the same time, sends the key PKB to the issuer equipment 100 in advance. The bank equipment 200 further comprises a signature generating device 230, which generates a bank signature SKB(PKI(PKU, K, x)x) corresponding to PKI(PKU, K, x) and x received from the user equipment 300, and the bank signature is sent to the issuer equipment 100.

The issuer equipment 100 verifies the validity of the bank signature SKB(K(PKU, K x)x) by the signature verifying device 135 with the bank public key PKB, and if valid, decrypts it by the decrypting device 140 with the secret key SKI to obtain PKU, K and x as is the case with the third embodiment. The issuer equipment 100 of this embodiment is common to that of the third embodiment in the processes of detecting a match between the decrypted amount x and the received amount x by the comparing device 180 and incrementing the balance counter EBC of the pseudonym PKU in the storage device 110 by x by the balance updating device 190. Thereafter, the issuer equipment 100 generates a signature SKI(PKU, x)) for (PKU, x) by the signature generating device 130 with the key SKI, then encrypts the signature by the encrypting device 150 with the common key K to obtain an encrypted signature K(SKI(PKU, x)), then further signs it by a signing device 155 with the key SKI to obtain an issuer signature SKI(K(SKI(PKU, x))), and sends the encrypted signature K(SKI(PKU, x)) and the issuer signature SKI(K (PKU, x)) to the bank equipment 200.

The bank equipment 200 verifies the validity of the issuer signature SKI(K(SKI(PKU, x))) by the signature verifying device 240 with the issuer public key PKI prestored in the storage device 210. If the signature found valid, then the issuer equipment 100 sends the original signature K(SKI (PKU, x)) to the user equipment 300. This is followed by the same processing as in the third embodiment.

The payment procedure, the deposit procedure, the return procedure and the procedure to cope with an attack are the same as those described previously in respect of FIGS. 16, 17 and 18, respectively.

Sixth Embodiment

This embodiment is identical with the third embodiment of FIG. 13 in the basic configuration of the electronic cash system used.

(1) User Registration Procedure

Figure 23:
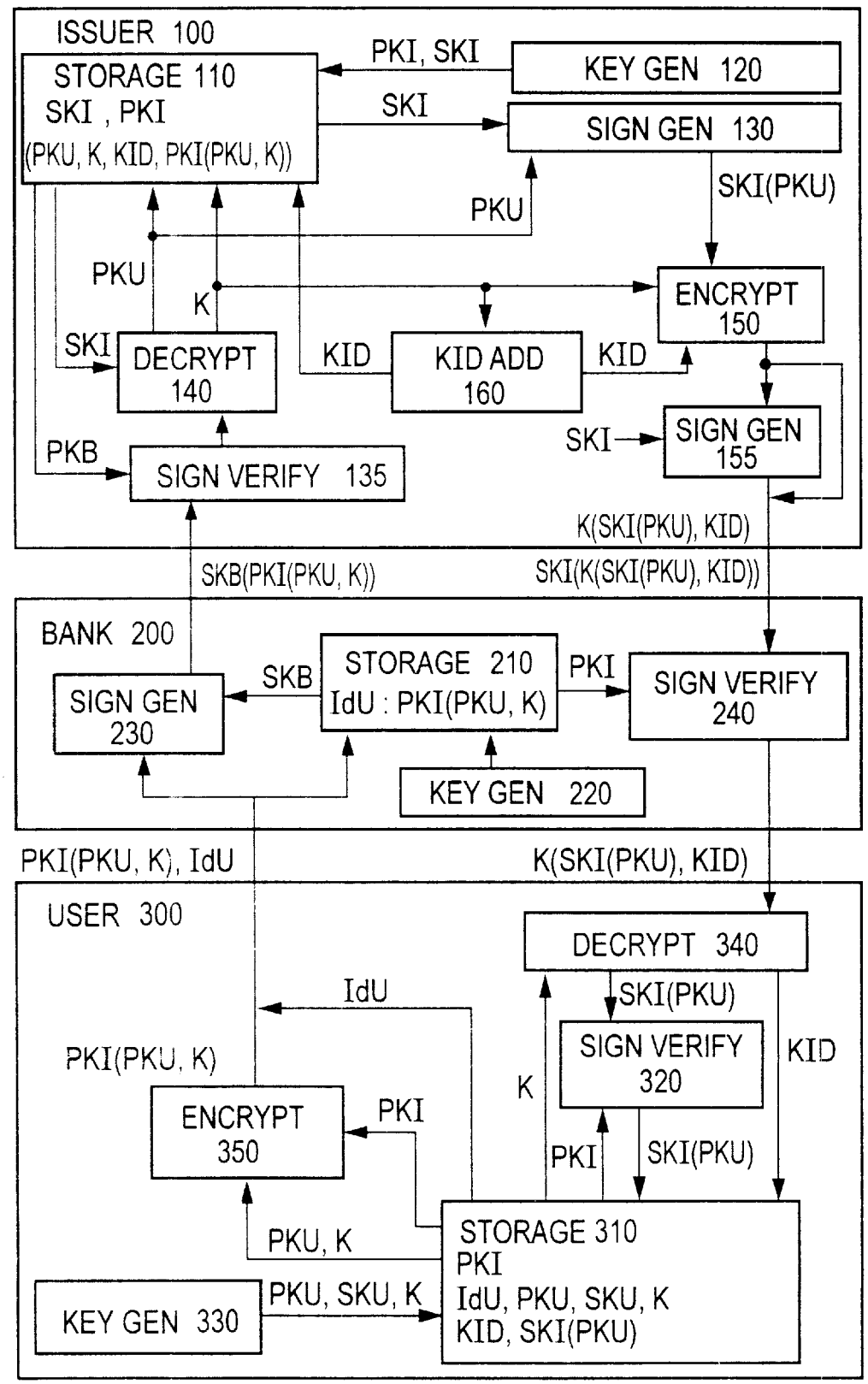
FIG. 23 is a block diagram depicting the functional configuration for a user registration process according to a sixth embodiment.

For the user registration procedure of this embodiment, the bank equipment 200 has a key generating device 220 in addition to the storage device 110 as depicted in FIG. 23. The bank equipment 200 generates a signature generating key SKB and a signature verifying key PKB by the key generating device 220, then sends the key PKB to the issuer equipment 100 in advance, and stores the keys SKB and PKB in the storage device 210. The bank equipment 200 is further provided with a signature generating device 230, which generates a bank signature SKB(PKI(PKU, K)) for PKI(PKU, K)). The bank signature SKB(PKI(PKU, K)) is sent to the issuer equipment 100.

The issuer equipment 100 has a signature verifying device 135, which verifies the validity of the bank signature SKB (PKI(PKU, K)) with the bank public key PKB. If the bank signature is valid, the issuer equipment 100 performs the same processing as in the third embodiment. That is, the issuer equipment 100 generates K(SKI (PKU, KID)), then generates an issuer signature SKI(K(SKI(PKU, KID))) for K(SKI(PKU, KID)), and sends both of them to the bank equipment 200.

The bank equipment 200 further comprises a signature verifying device 240. The issuer public key PKI is made public in advance and is prestored in the storage device 210. The bank equipment 200 verifies the validity of the signature SKI(K(SKI(PKU, KID))) from the issuer equipment 100 with the public key PKI, and if valid, performs the same processing as in the fourth embodiment.

(2) Withdrawal Procedure

Figure 20:
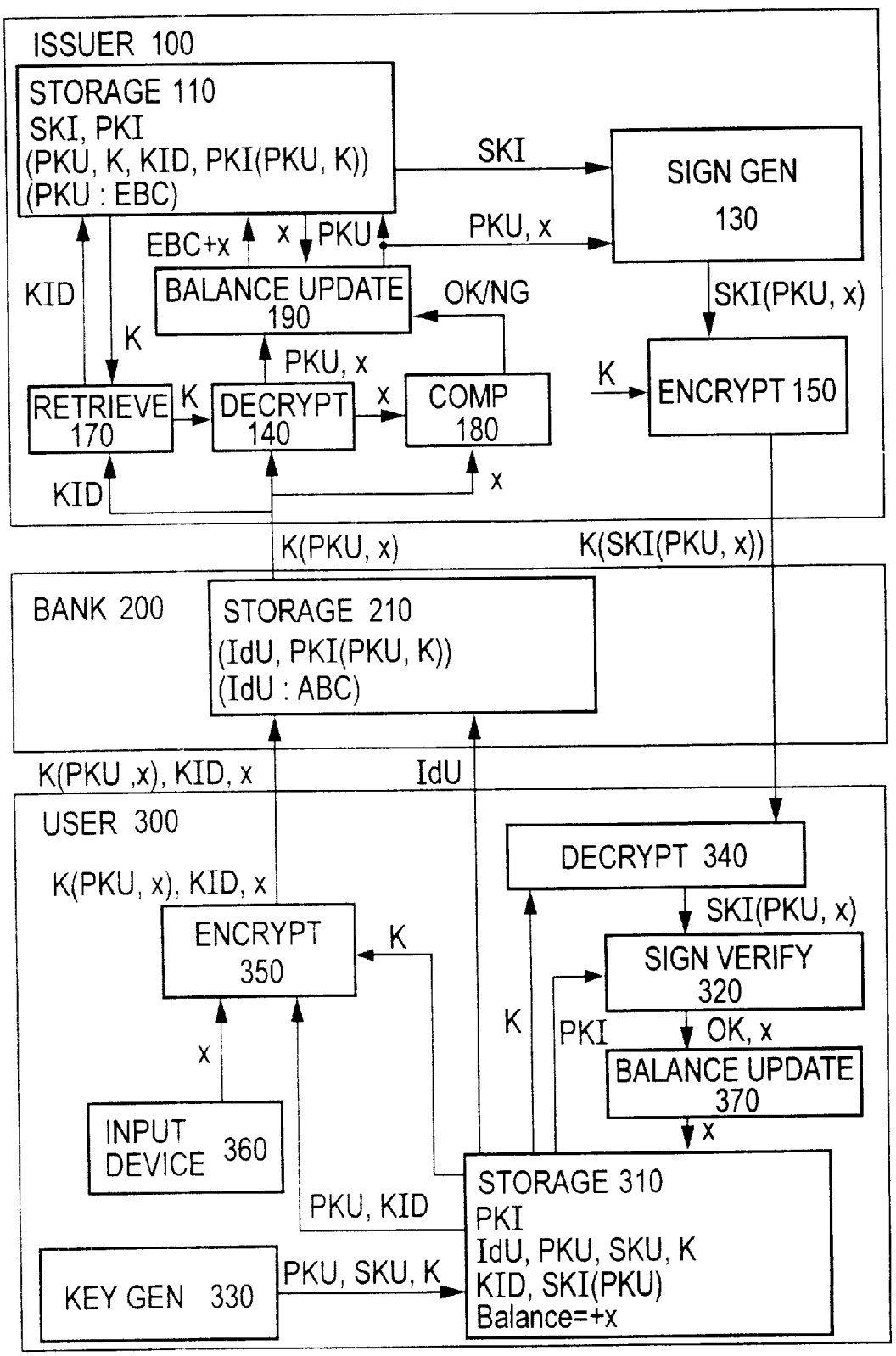
FIG. 20 is a block diagram depicting the functional configuration for a withdrawal process according to the fourth embodiment.
Figure 24:
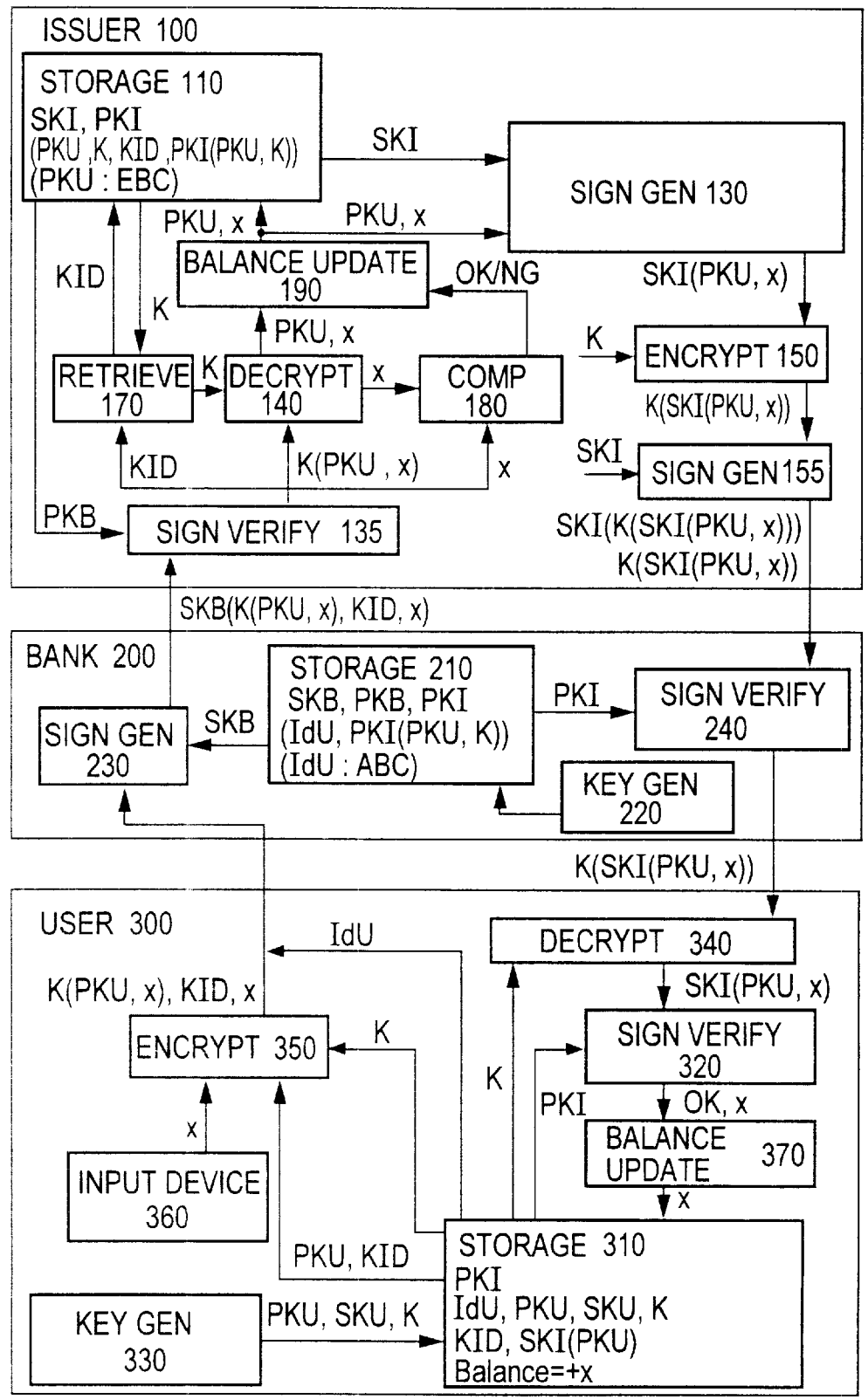
FIG. 24 is a block diagram depicting the functional configuration for a withdrawal process according to the sixth embodiment.

For the withdrawal procedure the bank equipment 200 has, as depicted in FIG. 24, a key generating device 220 in addition to the storage device 210 shown in FIG. 20. The bank equipment 200 generates a signature generating key SKB and a signature verifying key PKB by the key generating device 220, then prestores them in the storage device 210, and at the same time, sends the key PKB to the issuer equipment 100 in advance. The bank equipment 200 further comprises a signature generating device 230, which generates a bank signature SKB(K(PKU, x), KID, x) corresponding to K(PKU, x), KID and x received from the user equipment 300, and the bank signature is sent to the issuer equipment 100.

The issuer equipment 100 verifies the validity of the bank signature SKB(K(PKU, x), KID, x) by the signature verifying device 135 with the bank public key PKB, and if valid, retrieves the common key K corresponding to the key information KID from the storage device 110 by the retrieving device 140, and decrypts K(PKU, x) by the decrypting device 140 with the common key K to obtain PKU, and x as is the case with the fourth embodiment. The issuer equipment 100 of this embodiment is common to that of the fourth embodiment in the processes of detecting a match between the decrypted amount x and the received amount x by the comparing device 180 and incrementing the balance counter EBC of the pseudonym PKU in the storage device 110 by x by the balance updating device 190. Thereafter, the issuer equipment 100 generates a signature SKI(PKU, x), then encrypts it by the encrypting device 150 with the common key K to obtain an encrypted signature K(SKI(PKU, x)), then further signs it by a signing device 155 with the key SKI to obtain an issuer signature SKI(K(SKI(PKU, x))), and sends the encrypted signature K(SKI)PKU, x)) and the issuer signature SKI(K(SKI(PKU, x))) to the bank equipment 200.

The bank equipment 200 verifies the validity of the issuer signature SKI(K(SKI(PKU, x))) by the signature verifying device 240 with the issuer public key PKI prestored in the storage device 210. If the signature found valid, then the issuer equipment 100 sends the original signature K(SKI (PKU, x)) to the user equipment 300. This is followed by the same processing as in the FIG. 20 embodiment.

The payment procedure, the deposit procedure, the return procedure and the procedure to cope with an attack are the same as those in the fourth embodiment.

Modified Embodiments

In the embodiments described above, the user 300 generates a pair of keys (PKU, SKU) and the issuer 100 issues a single license for one key PKU of the user 300. In the case of making a plurality of payments to the same shop by electronic cash, the user uses the same key PKU and the same license SKI(PKU) for each payment. The shop cannot go so far as to associate the key PKU directly with the user real name IdU, but the repeated use of the same key and the same license may reveal, for example, a purchase propensity of the user—this is undesirable from the viewpoint of the protection of user privacy. This problem can be settled by modifying the fourth and sixth embodiments as described below. The following description will be given only of main points of the modifications.

(1) User Registration Procedure

According to this modification, in the user registration procedure shown in FIG. 19 or 23 the user equipment 300 generates, by the key generating device 330, n (where n is an integer equal to or greater than 2) public keys PKU1, PKU2, ..., PKUn as pseudonyms and n secret keys SKU1, SKU2, ..., SKUn corresponding thereto, then encrypts the public keys by the encrypting device 350 with the issuer public key PKI to obtain PKI(PKU1, PKU2, ..., PKUn, K), and sends it to the bank 200 together with the user real name IdU.

The bank equipment 200 stores the received user real name IdU and encrypted information PKI(PKU1, PKU2, ..., PKUn, K) in the storage device 210 in correspondence with each other, and sends the encrypted information intact (in FIG. 19) to the issuer equipment 100 or together with the bank signature (in FIG. 23).

The issuer equipment 100 obtains (PKU1, PKU2, ..., PKUn, K) by decryption, then adds the identification number KID by the KID adding device 160 to the key K, and stores the pseudonyms PKU1, PKU2, ..., PKUn and the encrypted information PKI(PKU1, PKU2, ..., PKUn, K) in the storage device 110 in correspondence with the identification number KID. Next, the issuer equipment 100 signs each pseudonym PKUi (where i=1, ..., n) with the issuer secret key SKI to obtain n signatures SK!(PKUi) (where i=1, ..., n), then encrypts pairs of n signatures and the identification number KID with the common key K to obtain encrypted information K(SKI(PKU1), SKI (PKU2), ..., SKI(PKUn), KID), and sends it intact (in FIG. 19) to the bank 200 or after signing it with the issuer secret key SKI. The bank 200 sends the received information intact (in FIG. 19) to the user 300 or after verifying the validity of the issuer signature attached to the received information.

The user 300 performs the same processing as in FIG. 19 or 23 to obtain the identification number KID and the n licenses SKI(PKUi) (where i=1, ..., n) by decryption and stored them in the storage device 310.

(2) Withdrawal Procedure (Electronic Cash Issuing Procedure)

In FIG. 20 or 24, the user 300 encrypts an arbitrarily selected one of the n pseudonyms PKUI (where i is an integer in the range of 1 to n), the amount of money x desired to withdraw and the identification number KID with the common key K to obtain encrypted information K(PKUi, KID, x), and sends it to the bank 200 along with the user real name IdU, the amount x and the identification number KID. The bank 200 draws the amount x from the account ABC of the user real name IdU, and sends the encrypted information K(PKUi, KID, x), the amount x and the identification number KID intact (in FIG. 20) to the issuer equipment 100 or together with the bank signature generated using the bank secret key SKB (in FIG. 24).

The issuer equipment 100 retrieves the common key K corresponding to the identification number KID from the storage device 110, extracts the key PKUi, the identification number KID and the amount x by decryption with the common key K, and increments the balance counter EBC by x. Further, the issuer equipment 100 attaches its signature to a pair of the key PKUi and the amount x using the issuer secret key SKI to obtain SKI(PKUi, x), then encrypts it with the common key K to obtain K(SKI(PKUi, x)), and sends it intact (in FIG. 20) to the bank 200 or together with the issuer signature generated using the secret key SKI (in FIG. 24).

The bank 200 sends the received information intact (FIG. 20) to the user 300 or after verifying the validity of the issuer signature (FIG. 24).

The user 300 decrypts the encrypted information to obtain the issuer signature SKI(PKUi, x), from which it recognizes that the n licenses can be used, and the user 300 increments the balance counter Balance by x. That is, the user is allowed to use any of the n licenses, but the total amount of money paid should not exceed the balance of the balance counter Balance. By selectively using different licenses for making a plurality of payments to the same shop, it is possible to preclude the possibility of the relationship between a particular license and a particular purchase propensity being revealed to the shop—this provides increased security for user privacy.

Figure 25:
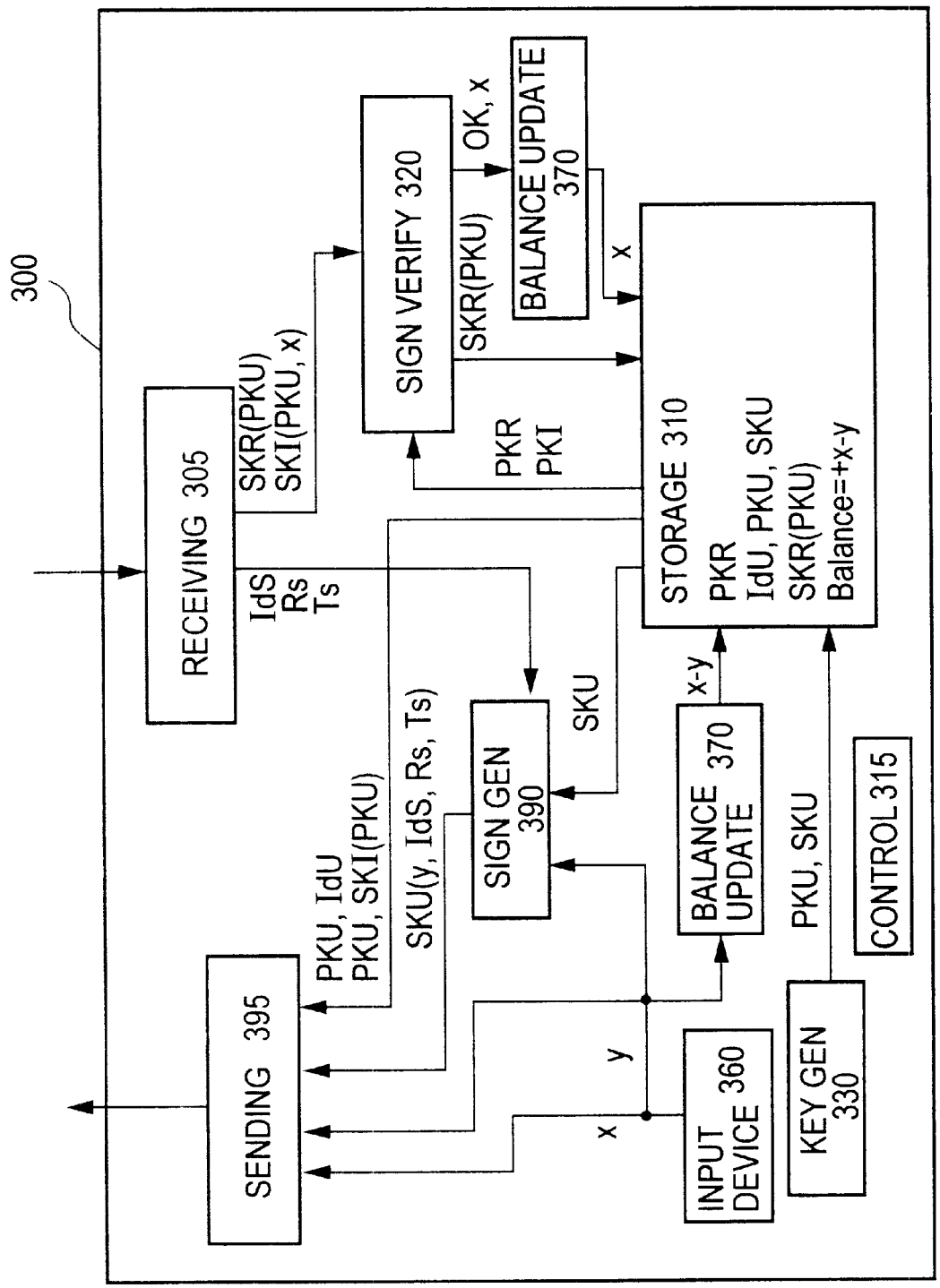
FIG. 25 is a block diagram showing an example of the functional configuration of user equipment in the first embodiment.

FIG. 25 illustrates en masse the devices of the user equipment 300 which performs the procedures of FIGS. 2, 3 and 4 in the first embodiment. The user equipment 300 is further provided with a receiving device 305, a sending device 395 and a control part 315. The user equipment 30 performs transmission and reception between it and the trustee equipment 500 or shop 400 via the sending device 395 and the receiving device 305, and the individual operations of the user equipment 300 are controlled by the control part 315.

In the user registration procedure (FIG. 2), the user equipment 300 sends the user real name IdU and the public key PKU, read out of the storage device 310, to the trustee equipment 500 via the sending device 395. The user equipment 300 receives the license SKR(PKU) from the trustee equipment 500 by the receiving device 305, then verifies its validity by the signature verifying device 320 and, if valid, stores it in the storage device 310. In the withdrawal procedure (FIG. 3), the user equipment 300 sends the public key PKU, the real name IdU and the amount x via the sending device 395 to the issuer equipment 100, and receives the signature SKI(PKU, x) from the issuer equipment 100 by the receiving device 305, then verifies its validity and, if valid, increments the balance counter Balance in the storage device 310 by x by the balance updating device 370. In the payment procedure (FIG. 4), the user equipment 300 sends the public key PKU and the license SKR(PKU) in the storage device 310 to the shop equipment 400 via the sending device 395. Upon receiving the challenge (IdS, Rs, Ts) from the shop equipment 400, the user equipment 300 affixes its signature to the challenge and the amount due y using the secret key SKU to obtain SKU(y, UdS, Rs, Ts), then sends it and the amount due y to the shop equipment 400, and decrements the balance counter EBC in the storage device 310 by y by a balance updating device 370'. Incidentally, the balance updating devices 370 and 370' may be identical in construction as in each embodiment described above.

Figure 5:
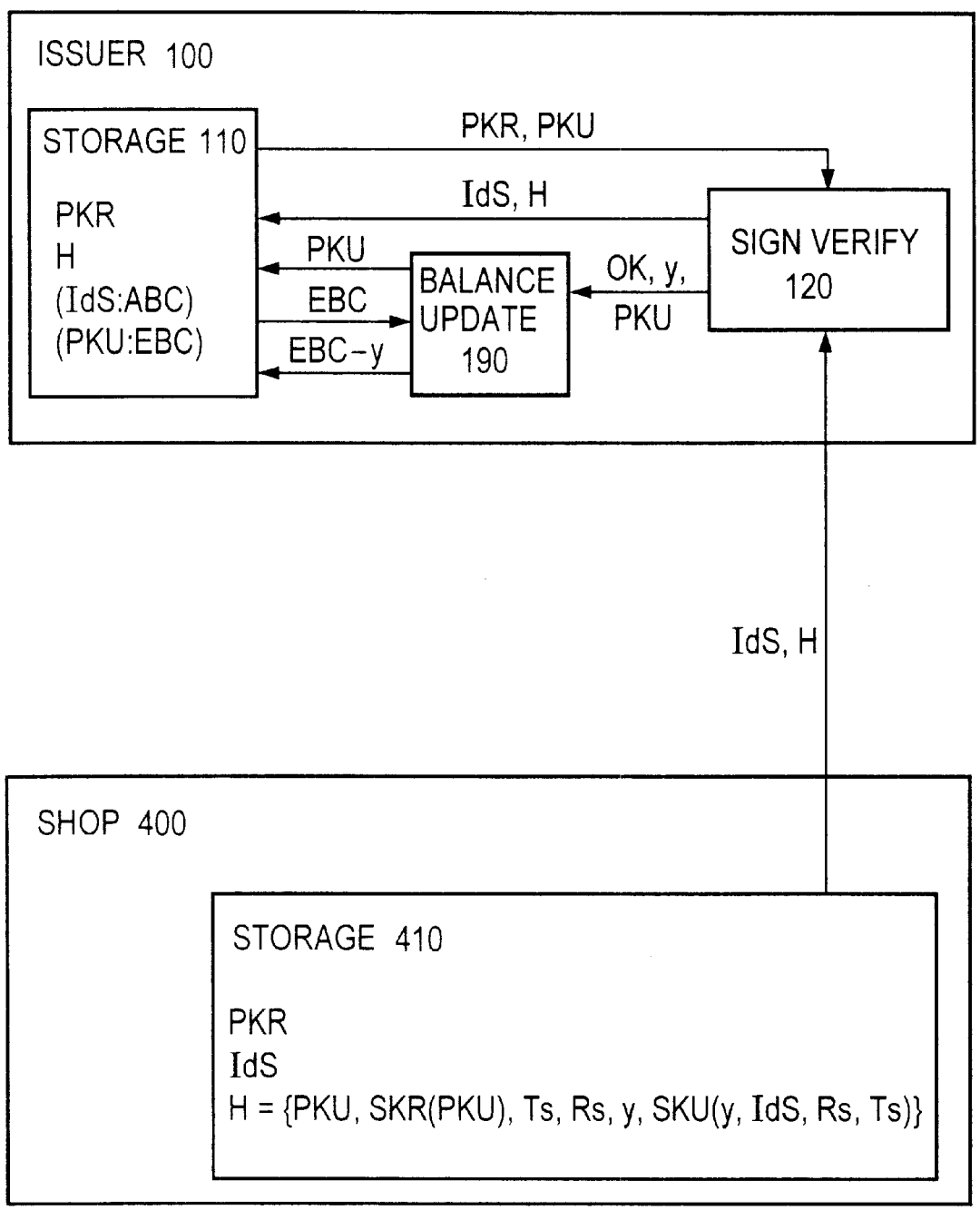
FIG. 5 is a block diagram depicting the functional configuration for a deposit process according to the first embodiment.
Figure 26:
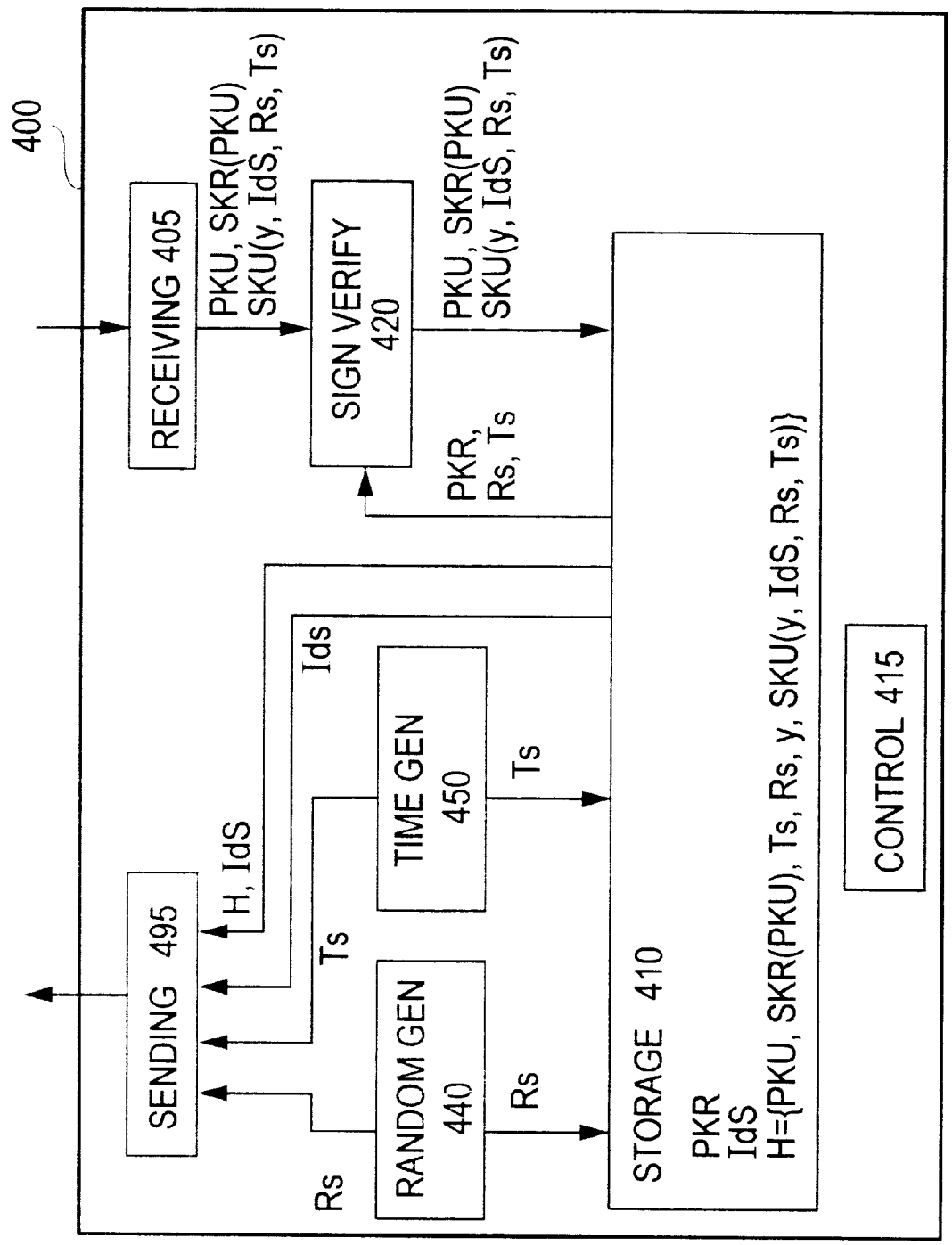
FIG. 26 is a block diagram showing an example of the functional configuration of shop equipment in the first embodiment.

FIG. 26 illustrates en masse the devices of the shop equipment 400 which perform the procedures of FIGS. 4 and 5 in the first embodiment. Upon receiving the license SKU(PKU) and the public key PKU from the user equipment 300 by a receiving device 405, the shop equipment 400 verifies the validity of the license by the signature verifying device 420, and if valid, generates the random number Rs and the time Ts by the random generating device 440 and the timing device 450, respectively, and sends them as a challenge via a sending device 495 to the user equipment 300 together with the shop real name IdS. Upon receiving the user signature SKU(y, IdS, Rs, Ts) by the receiving device 405 as a response to the challenge, the shop equipment 400 verifies the validity of the user signature by the verifying device 420 and, if valid, receives the payment of the amount y by electronic cash, thereafter storing in the storage device 410, as the history H, all the pieces of information exchanged between the shop equipment 400 and the user equipment 300. In the deposit procedure (FIG. 5), the shop equipment 400 reads out of the storage device 410 all the records of communication (the history H) with the user equipment 300, and sends them to the issuer equipment 100 via the sending device 495.

Figure 27:
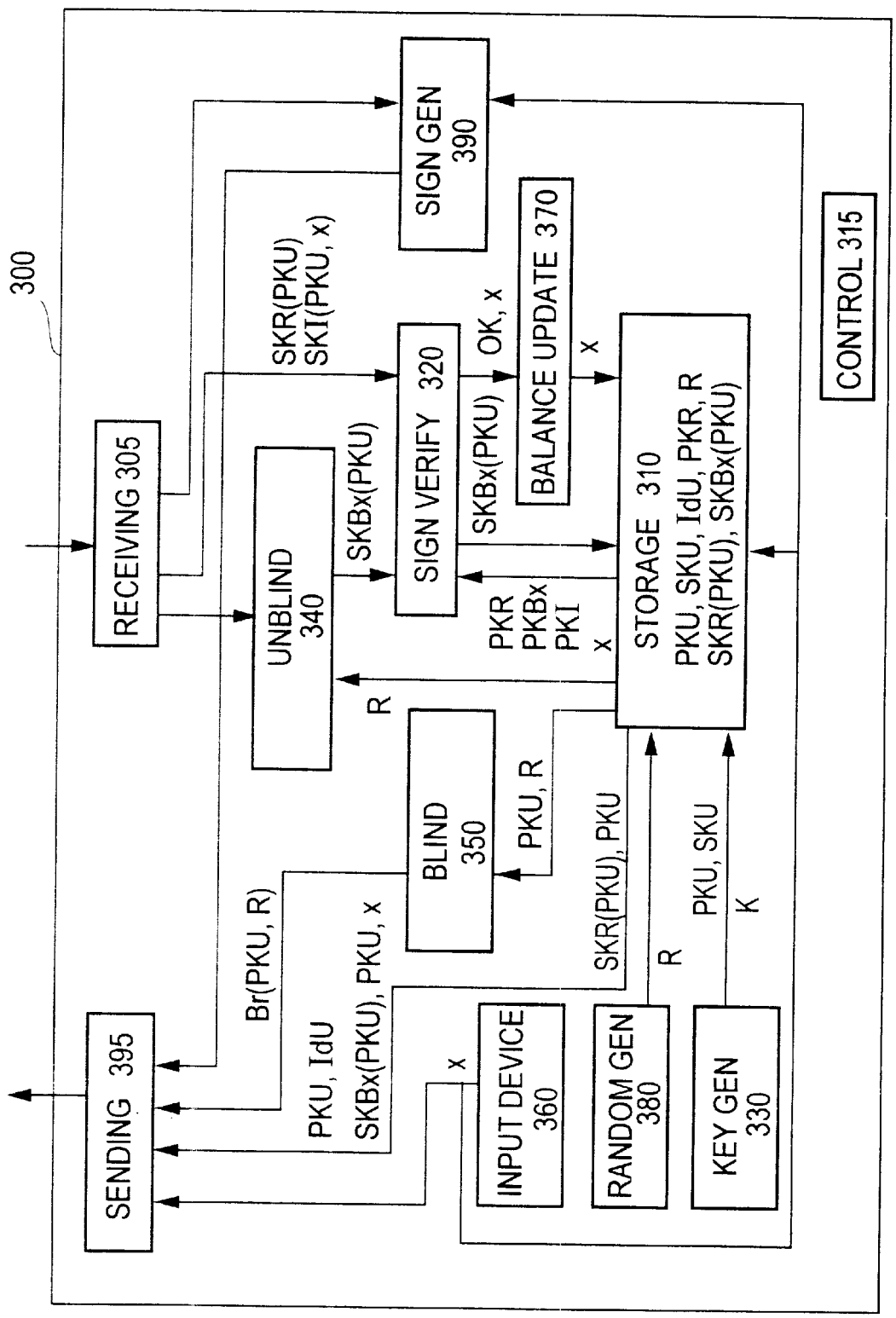
FIG. 27 is a block diagram showing an example of the functional configuration of user equipment in the second embodiment.

FIG. 27 illustrates en masse the devices of the user equipment 300 which performs the procedures of FIGS. 7 to 10 in the second embodiment. The user equipment 300 is further provided with a receiving device 305, a sending device 395 and a control part 315. In the user registration procedure (FIG. 7), the user equipment 300 reads out its public key PKU and real name IdU from the storage device 310, then sends them as a request for registration to the trustee equipment 100' via the sending device 395, and receives the license SKR(PKU) from the trustee equipment 100 by the receiving device 305, and verifies the validity of the license by the signature verifying device 320, and if valid, stores it in the storage device 310. In the withdrawal procedure (FIG. 8), the user equipment 300 sends via the sending device 395 to the bank equipment 200, as a request for issuance of electronic cash, information Br(PKU, R) generated by the blinding device 340 by blinding the public key PKU with the random number R generated by the random generating device 380, the amount of money x desired to withdraw and the user real name IdU. Upon receiving the signed blind information SKBx(Br(PKU, R)) from the bank equipment 200 by the receiving device 305, the user equipment 300 unblinds the received blind information by the unblinding device 340 to obtain information SKBx(PKU) as an electronic coupon, then verifies its validity by the verifying device 320 and, if valid, stores it in the storage device 310. Following this, the user equipment 300 sends the electronic coupon SKBx(PKU) to the issuer equipment 100 together with the amount x and the public key PKU, then receives from the issuer equipment 100 its signature SKI(PKU, x) for PKU and x, then verifies its validity by the verifying device 320, and if valid, increments the balance counter Balance in the storage device 310 by x. In the payment procedure (FIG. 10), the user equipment 300 sends the public key PKU and the license SKR(PKU) to the shop 400, and receives therefrom a challenge (IdS, Rs, Ts). The user equipment 300 attaches its signature to the amount due y and the challenge, then sends the signed information SKU(y, IdS, Rs, Ts) to the shop 400, and decrements the balance counter Balance in the storage device 310 by y.

Figure 28:
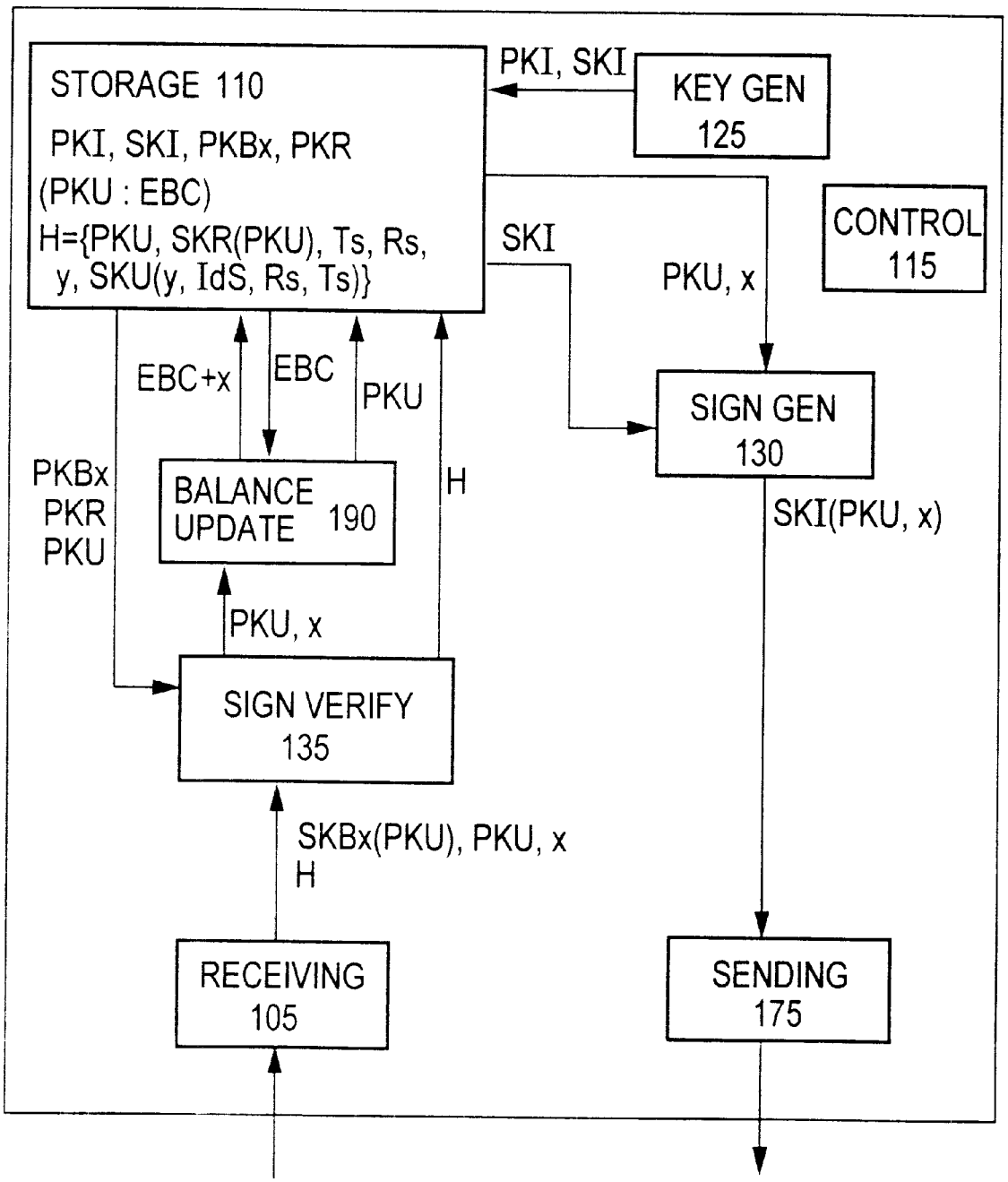
FIG. 28 is a block diagram showing an example of the functional configuration of issuing institution equipment in the second embodiment.

FIG. 28 illustrates en masse the devices of the issuer equipment 100 of the second embodiment shown in FIGS. 9 and 12 in the second embodiment. The issuer equipment 100 is further provided with a receiving device 105, a sending device 175 and a control part 115. In the withdrawal procedure (FIG. 9), the issuer equipment 100 verifies, by the signature verifying device 135, the validity of the information SKBx(PKU) received as an eletronic coupon from the user equipment 300 along with the public key PKU and the amount x, and if valid, adds the amount x by the balance updating device 190 to the electronic cash balance counter EBC, and attaches its signature to PKU and x by the signature generating device 130 with the secret key SKI, thereafter sending the signed information SKI(PKU, x) as electronic cash to the user equipment 300. In the electronic cash return procedure (FIG. 12), upon receiving the communication history H from the bank equipment 200, the issuer equipment 100 verifies the validity of SKR(PKU) and SKU(y, IdS, Rs, Ts) in the history H by the signature verifying device 135 with the issuer public key PKR and the user public key PKU, respectively, and if they are valid, decrements the balance counter EBC corresponding to the user public key PKU by y by the balance updating device 190.

Figure 16:
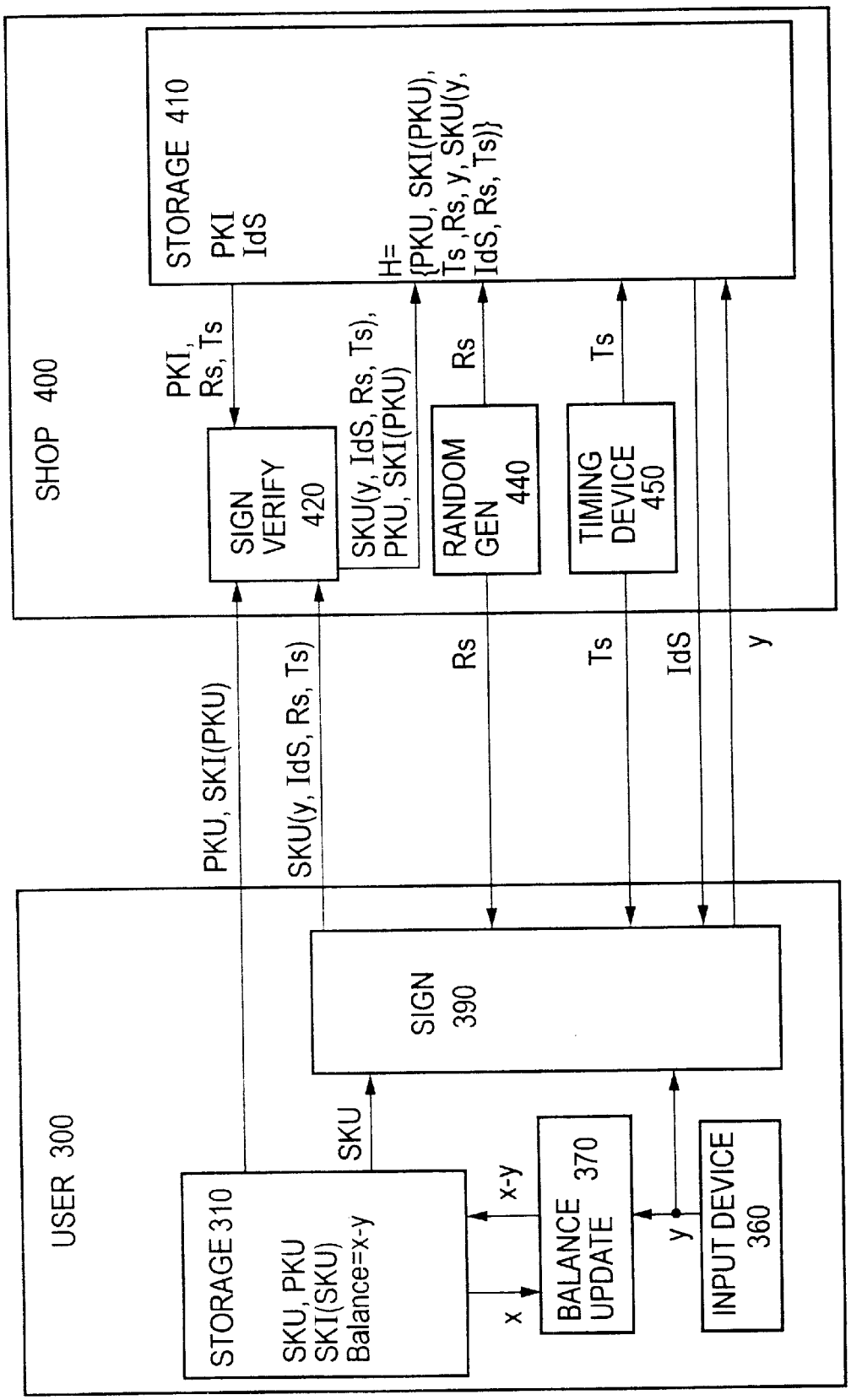
FIG. 16 is a block diagram depicting the functional configuration for a payment process according to the third embodiment.
Figure 29:
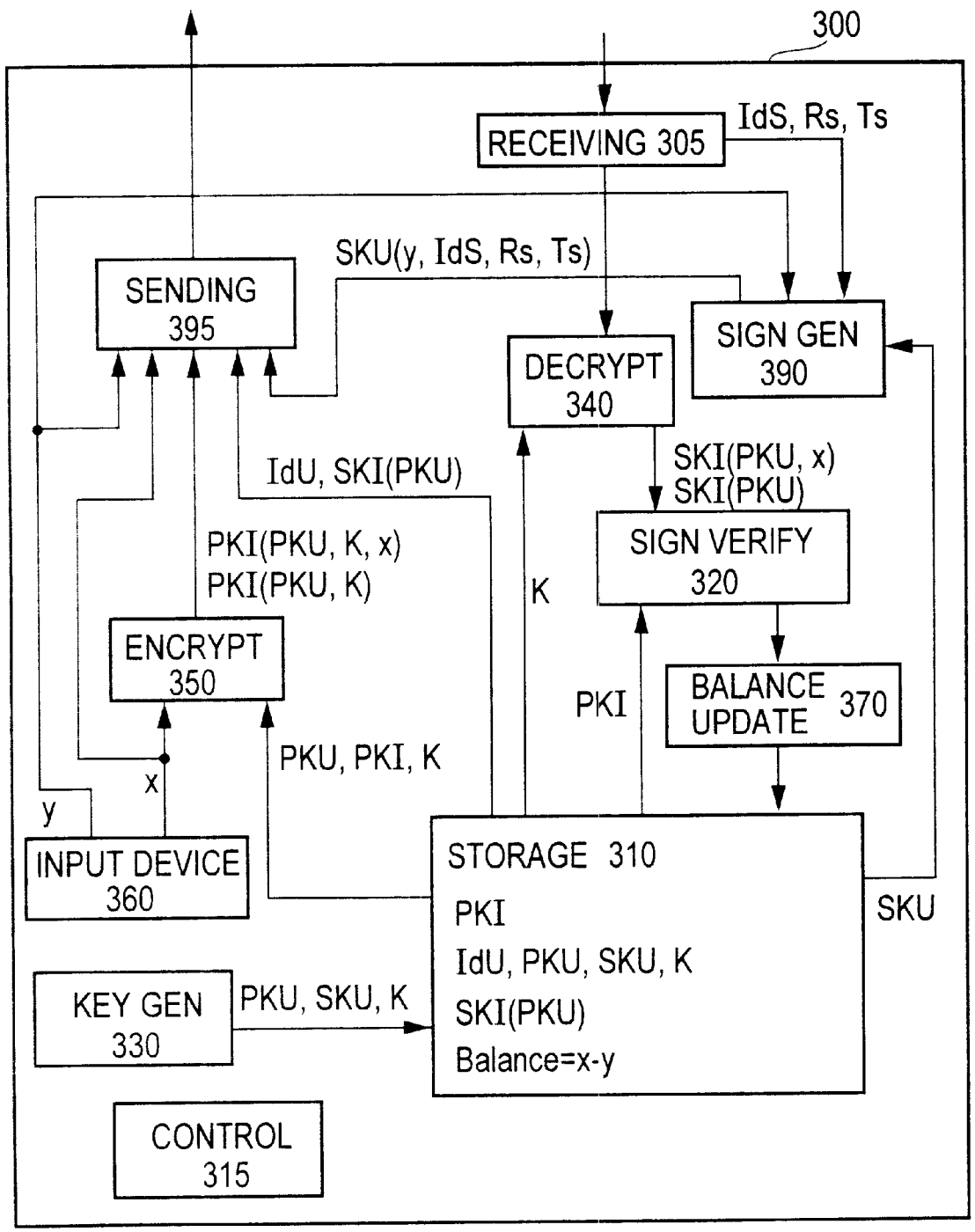
FIG. 29 is a block diagram showing an example of the functional configuration of issuer equipment in the third embodiment.

FIG. 29 illustrates en masse the devices of the user equipment 300 of the second embodiment shown in FIGS. 14, 15 and 16. The user equipment 300 is further provided with a receiving device 305, a sending device 375 and a control part 315. In the user registration procedure (FIG. 14), the user 300 encrypts the keys PKU and K by the encrypting device 350 with the key PKI, and sends the encrypted information PKI(PKU, K) to the bank 200 together with the user real name IdU. Upon receiving the encrypted license K(SKI(PKU)) received from the issuer 100 via the bank 200, the user 300 decrypts it by the decrypting device 340 to extract the license SKI(PKU), which is stored in the storage device 310. In the withdrawal procedure (FIG. 15), the user equipment 300 encrypts PKU, x and K by the encrypting device 350 with the public key PKI, and sends the encrypted information PKI(PKU, x, K) to the bank 200 along with the desired amount of withdrawal x. Upon receiving the encrypted signature K(SKI(PKU, x)) from the issuer 100 via the bank 200, the user 300 decrypts it by the decrypting device 340 to obtain the issuer signature SKI(PKU, x), then verifies its validity, and if valid, increments the electronic cash balance counter Balance in the storage device 310 by x. In the payment procedure (FIG. 16), the user 300 sends its public key PKU and the license SKI(PKU) to the shop 400. Upon receiving a challenge (IdS, Rs, Ts) from the shop 400, the user 300 attaches its signature to the challenge and the amount due y by the signature generating device 390, the sends the signed information SKU(y, IdS, Rs, Ts) to the shop 400 together with the amount y, and at the same time decrements the balance counter Balance in the storage device 310 by y by the balance updating device 370.

Figure 30:
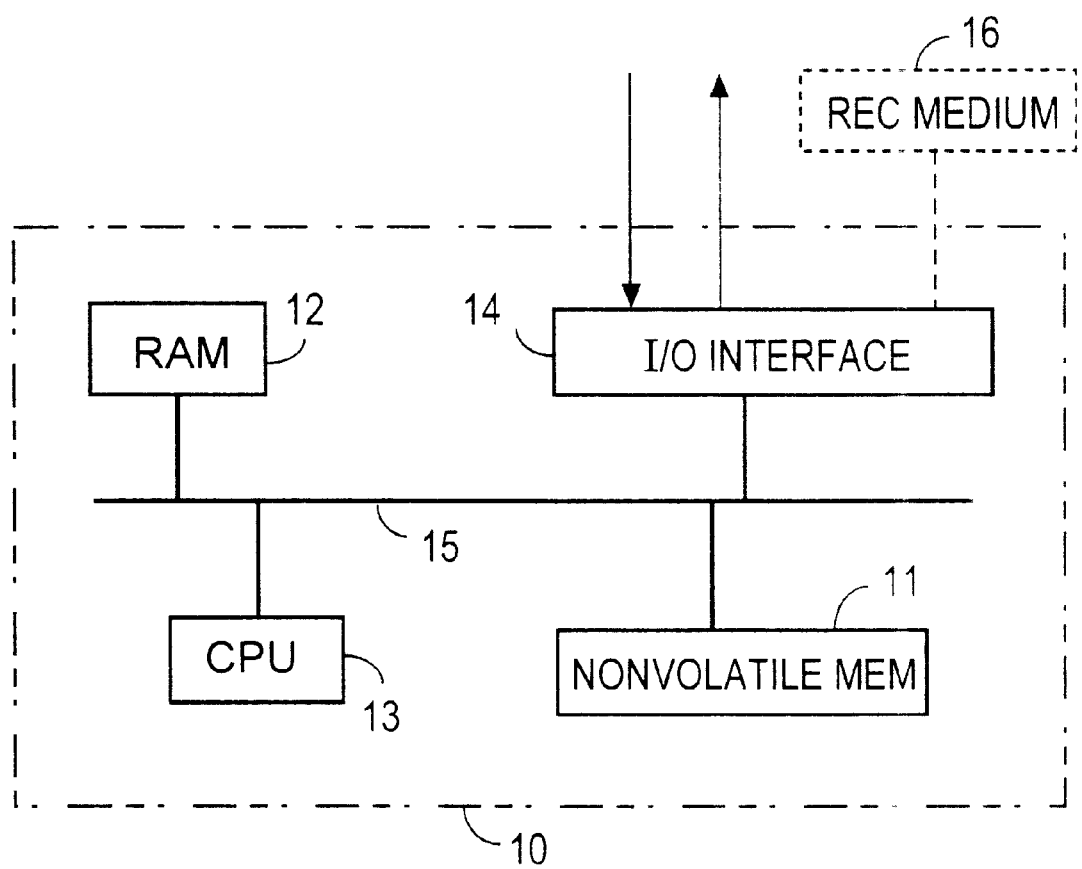
FIG. 30 is a block diagram illustrating a computer configuration for implementing the user equipment or issuing institution equipment by a computer program.

The user equipment 300, the trustee equipment 500, the bank equipment 200, the issuer equipment 100 and the shop equipment 400 in each embodiment of the present invention described above will hereinafter be referred to as electronic cash implementing equipment. The operating functions of these pieces of electronic cash implementing equipment can each be described as a procedure in the form of a computer program, and hence each equipment can be configured as a computer which executes the program, for example, as depicted in FIG. 30. In FIG. 30 electronic cash implementing equipment 10 is made up of a nonvolatile memory 11 like a hard disk, a RAM 12, a CPU 13, an I/O interface 14, and a bus 15 interconnecting them. In the nonvolatile memory 11 used as a recording medium, there is stored a program which describes, as a procedure, the function of any one of the user equipment 300, the trustee equipment 500, the bank equipment 200, the issuer equipment 100 and the shop equipment 400 in the above-described embodiments. The CPU 13 follows the program in the memory 11 to perform data moving, read/write, operations and so forth using the RAM 12 as a work area. The I/O interface 14 carries out therethrough data transmission and reception between the equipment 10 (for example, the user equipment 300) and another equipment (any one of the trustee equipment 500, the bank equipment 200, the issuer equipment 100 and the shop equipment 400), and/or performs manual input of commands. Alternatively, a program recorded on a broken-lined external recording medium, which is connected to the equipment 10 as required, may be read out and executed to perform the function of a desired electronic cash implementing equipment.

EFFECTS OF THE INVENTION

Conventionally, electronic cash is attached with a signature of an electronic cash issuing institution, and a user stores the issued electronic cash in user equipment and makes a payment with electronic cash by proving to the recipient that the electronic cash is attached with an authorized or valid signature. As regards a check for an improper use of electronic cash, the issuing institution stores therein all pieces of electronic cash it issued and checks each piece of electronic cash returned thereto. This conventional method has such shortcomings as listed below.

The user is required to have a storage device for holding electronic cash issued to him.

The receiver (shop), a bank and the electronic cash issuer are each required to have a device and time for verifying electronic cash.

The issuer is required to have a large-capacity storage for storing information corresponding to electronic cash issued.

Since the user specifying information (pseudonym) is determined at the time of issuance of electronic cash, it cannot be changed to a different pseudonym when the user makes a payment by electronic cash.

With the present invention:

The electronic cash issuing institution: has a balance counter for each user; issues electronic cash in response to a request from the user; increments the balance counter by the amount issued; and upon receiving electronic cash returned thereto, decrements the balance counter by the amount returned.

The user: has a balance counter in user equipment; upon receiving electronic cash issued from the issuing institution, increments the balance counter by the amount issued; and upon making a payment by electronic cash, decrements the balance counter by the amount paid; and pays by a user signature until the count value of the balance counter goes down to zero.

The shop verifies the validity of the user signature; and if it is found valid, then receives the payment, then stores the user signature, and returns the user signature to the issuing institution for conversion.

Hence, the user equipment is enabled to render payment without the need to have a storage for storing electronic cash. The issuing institution is capable of managing electronic cash information by the balance counter, and hence does not need to store the information. Moreover, in the prior art systems the user is not allowed to pay using a license different from that used for withdrawal because information on electronic cash withdrawn is attached with the user pseudonym (that is, to be attached with the signature of the issuing institution). In the present invention, however, since the amount of money payable is determined by the balance counter in the user equipment, the user can pay using a license different from that used for withdrawal. This makes it possible to store several kinds of licenses in the user equipment and selectively use them in accordance with the payment condition (payment under a pseudonym, payment under real name, payment via a network, or the like).

It will be apparent that many modifications and variations may be effected without departing from the scope of the novel concepts of the present invention.

What is claimed is:

1. A method for implementing electronic cash in an electronic cash system which comprises issuer equipment as an institution for issuing a signature to an amount of electronic cash, said issuer equipment having electronic cash balance counters each implemented in an issuer storage in correspondence to a respective user, for managing a balance of a total amount of electronic cash made available to and spent by each user; user equipment as a user which receives the signature issued from said issuer equipment, said user equipment having a balance counter for managing balance of total amount of electronic cash made available to and spent by the user; and shop equipment as an institution which receives from the user an amount of a payment, and wherein:

(a) said issuer equipment generates an issuer's signature to an amount of electronic cash in response to a request from said user equipment; incrementing said electronic cash balance counter by the amount of electronic cash; and, upon receiving an amount of payment returned thereto, decrementing said balance counter by the amount of payment returned based on a user signature; and (b) incrementing, upon receiving an increment, said user balance counter by the amount of electronic cash made available in response too the request from said user equipment without storing the electronic cash, making a payment of an amount to said shop equipment with a user signature without storing and sending said electronic cash received from said issuer to said shop; and decrementing said user balance counter by the amount of electronic cash paid, where user signature is defined as SKU(y, Ids, Rs, Ts) for: y—amount due to shop, Ids—shop real name, Rs—random number, and Ts—time information.

2. The method of claim 1, wherein said shop equipment verifies the validity of said user signature attached to electronic cash received from said user equipment and, if valid, receives said payment by electronic cash, then stores at least said user signature as history information, and returns said user signature to said issuer equipment for conversion.

3. The method of claim 1, wherein said shop equipment verifies the validity of said license received from said user, and if valid, receives the amount of payment by electronic cash; and stores said license as part of said history information; and said issuer equipment verifies the validity of said history information, and if valid, decrements said electronic cash balance counter corresponding to said pseudonym by the amount of payment, and stores the associated history information.

4. The method of claim 1 or 2, wherein said electronic cash system further comprises trustee equipment as an institution for registering therewith said user, and said method comprises:

user registration procedure wherein:
said user equipment generates, as a pseudonym, a public key for verifying its own signature, and registers it with said trustee equipment; and
said trustee equipment generates its signature for said user pseudonym as a license, and sends it to said user equipment;

electronic cash issuing procedure wherein:
said user equipment send its requested amount of issue and said pseudonym to said issuer equipment;
said issuer equipment responds to said request from said user equipment to generate an issue signature for said requested amount of issue and said pseudonym, and sends said issuer signature as electronic cash to said user equipment;
said user equipment verifies the validity of said issuer signature received as electronic cash, and if valid, increments said user balance counter by the amount of electronic cash received without storing the electronic cash; and electronic cash payment procedure wherein:
said user equipment generates said user signature for the amount of payment and sends said license, said pseudonym and said user signature to said shop equipment regarding information including at least said license and said pseudonym as electronic cash.

5. The method of claim 3, wherein said shop equipment verifies the validity of said license received from said user, and if valid, receives the amount of payment by electronic cash; and stores said license as part of said history information; and said issuer equipment verifies the validity of said history information, and if valid, decrements said electronic cash balance counter corresponding to said pseudonym by the amount of payment, and stores the associated history information.

6. The method of claim 5, wherein said shop equipment verifies the validity of said license sent thereto from said user equipment, and if valid, receives it as electronic cash, and stores it as part of said history information, and said method comprises:

electronic cash depositing procedure wherein:
said shop equipment sends a real name of said shop and said history information to said bank equipment; and
said bank equipment verifies the validity of said license and said user signature, and if valid, increases the balance in an account of said shop by the amount paid; and electronic cash return procedure wherein:
said bank equipment sends said history information to said issuer equipment; and
said issuer equipment verifies the validity of said history information, and if valid, decrements said electronic cash balance counter corresponding to said pseudonym of said user by the amount paid, and stores said history information.

7. The method of claim 1 or 2, wherein said electronic cash system further comprises bank equipment as an institution for managing an account of each user and for issuing a coupon, and trustee equipment as an institution for registering therewith each user, and said method comprises:

user registration procedure wherein:
said user equipment generates a public key for verifying its own signature as a pseudonym, and registers it with said trustee equipment; and
said trustee equipment generates its signature for said user public key as a license, and sends it to said user equipment;

electronic cash issuing procedure wherein:
said bank equipment issues a coupon in exchange for the reduction of the balance in an account of said user in response to a request from said user equipment, and sends thereto said coupon;
said user equipment sends said coupon and said pseudonym to said issuer equipment;
said issuer equipment generates an issuer signature for said pseudonym and the amount of issue, as electronic cash corresponding to said coupon, then increments said electronic cash balance counter corresponding to said user pseudonym, and sends said issuer signature to said user equipment; and
said user equipment verifies the validity of said issuer signature sent thereto from said issuer equipment, and if valid, increments said balance counter by the amount received without storing the electronic cash; and electronic cash payment procedure wherein:
said user equipment generates said user signature for information including the amount due, and sends said license, said pseudonym and said user signature to said shop equipment.

8. The method of claim 1 or 2, wherein said electronic cash system further comprises a bank equipment as an institution for managing an account of each user, and said method comprises:

user registration procedure wherein:
said user equipment generates a common key, then encrypts a signature verifying public key, which is a pseudonym of said user and said common key with an issuer public key, and sends said encrypted pseudonym to said bank equipment together with user identification information IdU;
said bank equipment stores said user identification information IdU and said encrypted pseudonym, and sends said encrypted pseudonym to said issuer equipment;
said issuer equipment decrypts said encrypted data from said bank equipment with an issuer secret key to extracts said pseudonym and said common key of said user, then stores said pseudonym and said encrypted pseudonym, then generates an issuer signature for said pseudonym as a license, then encrypts said license with said common key, and sends said encrypted license to said bank equipment;
said bank sends said encrypted license from said issuer equipment to said user equipment; and
said bank equipment transmits information received from said issuer equipment to said user equipment;
said user equipment decrypts said encrypted license with said common key to extract said license, and stores it;

electronic cash issuing procedure wherein:
said user equipment encrypts its pseudonym and a common key with an issuer public key, and sends encrypted information to said bank equipment together with user identification information IdU and its requested amount of withdrawal;
said bank equipment reduces the balance in an account of said user in response to said request from said user equipment, and in exchange therefor, sends to said issuer equipment said requested amount of withdrawal and said encrypted user pseudonym and common key received from said user equipment;
said issuer equipment decrypts said received information with an issuer secret key to extract said user pseudonym and said common key, then generates as electronic cash an issuer signature for said user pseudonym and said requested amount of withdrawal, then encrypts said electronic cash with said common key, then increments said electronic cash balance counter corresponding to said user pseudonym by the amount withdrawn, and sends said encrypted electronic cash to said bank equipment;
said bank equipment sends said encrypted electronic cash to said user equipment; and
said user equipment decrypts said encrypted electronic cash with said common key, verifies the validity of said issuer signature attached to said electronic cash, and if valid, increments said user balance counter by the amount received from said bank equipment; and payment procedure wherein:
said user equipment decrements said balance counter by the amount due, generates a user signature therefor, and sends said user signature to said shop equipment together with said license and said user pseudonym.

9. The method of claim 8, wherein said shop equipment verifies the validity of said license received from said user equipment, and if valid, receives it as electronic cash, and stores said license as part of said history information; and said method comprises:

electronic cash depositing procedure wherein:
said shop equipment sends said history information to said bank equipment; and said bank equipment verifies the validity of said license and said user signature, and if valid, increases the balance in an account of said shop by the amount received; and electronic cash return procedure wherein:
said bank equipment sends said history information to said issuer equipment; and
said issuer equipment verifies the validity of said history information, and if valid, decrements said balance counter corresponding to said user pseudonym by the amount paid, and stores said history information.

10. The method of claim 8, wherein:
in said user registration procedure:
said bank equipment generates, as a pseudonymous bank signature, a bank signature for an encrypted pseudonym, and sends said pseudonymous bank signature to said issuer equipment;
said issuer equipment verifies the validity of said pseudonymous bank signature received from said bank equipment, and if valid, generates said issuer signature for said encrypted license, and sends to said bank equipment said issuer signature for said encrypted license; and
said bank equipment verifies the validity of said issuer signature for said encrypted license; and in said electronic cash issuing procedure:
said bank equipment generates a bank signature for said encrypted pseudonym and said requested amount of withdrawal, and sends said bank signature to said issuer equipment;
said issuer equipment verifies the validity of said bank signature, and if valid, generates an issuer signature for said encrypted electronic cash, and sends to said bank equipment said issuer signature for said encrypted electronic cash; and
said bank equipment verifies the validity of said issuer signature.

11. The method of claim 1 or 2, wherein said electronic cash system further comprises a bank equipment as an institution for managing an account of each user, and said method comprises:
user registration procedure wherein:
said user equipment generates a common key, then encrypts a signature verifying public key and said common key as a pseudonym of said user with an issuer public key, and sends said encrypted pseudonym to said bank equipment together with user identification information IdU;
said bank equipment stores said user identification information IdU and said encrypted pseudonym, and sends said encrypted pseudonym to said issuer equipment;
said issuer equipment decrypts said encrypted data from said bank equipment with an issuer secret key to extracts said pseudonym and said common key, then adds an identifier for said common key as common key information KID, then stores said pseudonym and said encrypted pseudonym, and at the same time, stores said common key information KID and said common key in correspondence with each other, then generates an issuer signature for said pseudonym as a license, then encrypts said license and said common key information KID with said common key to obtain an encrypted license, and sends said encrypted license to said bank equipment; and said bank equipment sends said encrypted information received from said issuer equipment to said user equipment; and
said user equipment decrypts said encrypted license with said common key to extract said license and said common key information KID, and stores them;

electronic cash issuing procedure wherein:
said user equipment encrypts its pseudonym and its requested amount of withdrawal with said common key to obtain an encrypted pseudonym, and sends said common key information KID and said encrypted pseudonym to said bank equipment together with user identification information IdU and said requested amount;
said bank equipment reduces the balance in an account of said user in response to said request from said user equipment, and sends to said issuer equipment said requested amount, said encrypted pseudonym and said common key information KID received from said user equipment;
said issuer equipment retrieves said common key corresponding to said common key information KID received from said bank equipment, decrypts said received encrypted pseudonym with said common key to extract said user pseudonym, then generates as electronic cash an issuer signature for said user pseudonym and said requested amount, then encrypts said electronic cash with said common key, then increments said electronic cash balance counter corresponding to said user pseudonym by the amount of said encrypted electronic cash, and sends said encrypted electronic cash to said bank equipment;
said bank equipment sends said encrypted electronic cash to said user equipment; and
said user equipment decrypts said encrypted electronic cash with said common key, verifies the validity of said issuer signature of said electronic cash, and if valid, increments said user balance counter by the amount of said electronic cash received from said bank equipment without storing the electronic cash; and electronic cash payment procedure wherein:
said user equipment decrements said balance counter by the amount due, generates a user signature therefor, and sends said user signature to said shop equipment together with said license and said user pseudonym.

12. The method of claim 11, wherein:
in said user registration procedure:
said bank equipment generates, as a pseudonymous bank signature, a bank signature for an encrypted pseudonym, and sends said pseudonymous bank signature to said issuer equipment;
said issuer equipment verifies the validity of said pseudonymous bank signature received from said bank equipment, and if valid, generates said issuer signature for said encrypted license, and sends to said bank equipment said issuer signature for said encrypted license; and
said bank equipment verifies the validity of said issuer signature for said encrypted license; and in said electronic cash issuing procedure:
said bank equipment generates a bank signature for said encrypted pseudonym and said requested amount of withdrawal, and sends said bank signature to said issuer equipment;

said issuer equipment verifies the validity of said bank signature, and if valid, generates an issuer signature for said encrypted electronic cash, and sends to said bank equipment said issuer signature for said encrypted electronic cash; and said bank equipment verifies the validity of said issuer signature.

13. The method of claim 11, wherein:

in said user registration procedure:

said user equipment generates, as n pseudonyms, n signature verifying public keys including said signature verifying public key, said n being an integer equal to or greater than 2, then generates n signature generating secret keys corresponding to said n signature verifying public keys and including said signature generating secret key, then encrypts said n pseudonyms and said common key with said issuer public key, and sends them as said encrypted pseudonym to said bank equipment together with said user identification information IdU;

said issuer equipment decrypts data received from said bank equipment with an issuer secret key to extract said n pseudonyms and said common key, then stores said n pseudonyms and said encrypted pseudonym in correspondence with each other, then attaches an issuer signature to each of said n pseudonyms to generate n licenses including said license, then encrypts said n licenses and said common key information KID with said common key to obtain encrypted information, and sends said encrypted information as said encrypted license to said bank equipment; and said user equipment decrypts said encrypted license with said common key to extract said n licenses and said common key information KID, and stores them;

in said electronic cash issuing procedure:

said user equipment encrypts an arbitrarily selected one of said n pseudonyms and its requested amount of withdrawal with said common key to generate said encrypted pseudonym, and sends said encrypted pseudonym to said bank equipment together with said user identification information IdU, said requested and said common key information KID;

said issuer equipment decrypts said encrypted pseudonym with said common key to extract said selected pseudonym, then attaches said issuer signature to a set of said extracted pseudonym and said requested amount to generate said electronic cash, then encrypts said electronic cash with a common key into said encrypted electronic cash, then increments by said requested amount an electronic cash balance counter corresponding to a set of said n pseudonyms including said selected pseudonym, and sends said encrypted electronic cash to said bank equipment; and said user equipment decrypts said encrypted electronic cash to obtain said electronic cash, then verifies the validity said issuer signature attached to said electronic cash, and if valid, increments said balance counter in said user equipment by said requested amount without storing the electronic cash; and in said electronic cash payment procedure:

said user equipment selects any one of said n signature verifying secret keys, then sends to said shop equipment that one of said n licenses corresponding to said selected signature generating secret key and that one of said pseudonyms corresponding to said selected signature generating secret key, then decrements said user balance counter by the amount due, then generates a user signature for said amount due with said selected signature generating secret key, and sends said user signature to said shop equipment.

14. In an electronic cash system which comprises issuer equipment as an institution for issuing a signature to an amount of electronic cash, user equipment as a user for receiving said signature to an amount of electronic cash issued from said issuer equipment and shop equipment as an institution for receiving payment by a user signature, said user equipment comprising:

key generating means for generating a user secret key SKU and a public key PKU as a pseudonym corresponding to said user secret key; input means for inputting the amount of withdrawal x and the amount due y;

storage means for storing user identification information IdU, said secret key SKU, said public key PKU and a license for the use of electronic cash;

balance counter means set in said storage means;

signature generating means for generating a user signature as electronic payment without storing and sending the amount of withdrawal x received from said issuer equipment;

balance updating means for decrementing said balance counter by said amount due y at the time of generating said user signature;

sending means for sending information to the other institutions;

receiving means for receiving information from said other institutions; and control means far controlling each of said means to execute its process, where user signature is defined as SKU(y, Ids, Rs, Ts) for: y—amount due to shop, Ids—shop real name, Rs—random number, and Ts—time information.

15. The user equipment of claim 14, wherein: said electronic cash system further comprises trustee equipment having a public key PKR and a secret key SKR; said issuer equipment manages an account of said user; and said storage means has stored therein said public key PKR of said trustee; said user equipment further comprising:

signature verifying means for verifying, with said public key PKR, the validity of a trustee signature SKR(PKU) attached to said pseudonym PKU received from said trustee equipment and for storing said trustee signature as said license in said storage means if said trustee signature is valid.

16. The user equipment of claim 14, wherein: said electronic system further comprises trustee equipment having a public key PKR and a signature generating secret key SKR, and bank equipment for managing an account of said user; and said storage means has stored therein said public key PKR; said user equipment further comprising:

signature verifying means for verifying, with said public key PKR, the validity of a trustee signature SKR(PKU) attached to said pseudonym PKU received from said trustee equipment and for storing said trustee signature as said license in said storage means if said trustee signature is valid;

wherein said signature verifying means includes means for verifying a bank signature SKBx(PKU) with a secret key SKBx corresponding to said amount of withdrawal x, sent from said bank equipment in response to a user's request thereto for withdrawal, and for storing said bank signature as a coupon in said storage means if it is valid; and wherein at the time of requesting issuance of electronic cash, said sending means sends said coupon SKBx (PKU), said amount of withdrawal x and said pseudonym PKU to said issuer equipment, and at the time of payment, sends said license SKR(PKU) to said shop.

17. The user equipment of claim 16, further comprising:

random generating means for generating and storing a random number R in said storage means;

blinding means for blinding said pseudonym with said random number R to obtain Br(PKU, R) and for sending it as said request for withdrawal to said bank equipment together with said amount of withdrawal x; and unblinding means for unblinding a bank signature SKBx (Br(PKU, R)) for said request for withdrawal received from said bank equipment with said random number R to obtain a signature SKBx(PKU) for said pseudonym PKU.

18. The user equipment of claim 14, wherein: said electronic cash system further comprises bank equipment for managing an account of said user; and said key generating means comprises means for generating and storing a common key K in said storage means; said user equipment further comprising:

encrypting means for encrypting said pseudonym PKU and said common key K with said public key PKI to obtain encrypted information PKI(PKU, K) and for sending it as a request for registration to said bank together said user identification information IdU;

decrypting means for decrypting encrypted issuer signature K(SKI(PKU)) for said pseudonym PKU received via said bank to obtain an issuer signature SKI(PKU); and signature verifying means for verifying the validity of said decrypted issuer signature SKI(PKU) and for storing it as said license in said storage means if it is valid;

wherein, at the time of requesting an issuance of electronic cash, said encrypting means encrypts said pseudonym PKU, said common key K and said amount of withdrawal x with said issuer public key PKI to obtain encrypted information PKI(PKU, K, x), and sends it as said request for withdrawal to said bank together with said amount of withdrawal x and said user identification information IdU;

wherein said decrypting means comprises means for decrypting an encrypted issuer signature K(SKI(PKU, x)) received via said bank to obtain an issuer signature SKI(PKU, x);

wherein said signature verifying means comprises means for verifying the validity of said issuer signature SKI (PKU, x) with said public key PKI; and wherein said balance updating means comprises means for incrementing said balance counter in said storage means by x when said issuer signature SKI(PKU, x) is found valid by said signature verifying means.

19. The user equipment of claim 14, wherein: said electronic cash system further comprises bank equipment for managing an account of said user; and said key generating means comprises means for generating and storing a common key K in said storage means; said user equipment further comprising:

encrypting means for encrypting said pseudonym PKU and said common key K with said public key PKI to obtain encrypted information PKI(PKU, K) and for sending it as a request for registration to said bank together said user identification information IdU;

decrypting means for decrypting encrypted issuer signature K(SKI(PKU, KID)) received via said bank to obtain an issuer signature SKI(PKU) and common key information KID; and signature verifying means for verifying the validity of said decrypted issuer signature SKI(PKU) and for storing it as said license in said storage means together with said common key information KID if it is valid;

wherein, at the time of requesting an issuance of electronic cash, said encrypting means encrypts said pseudonym PKU, said common key K and said amount of withdrawal x with said issuer public key PKI to obtain encrypted information PKI(PKU, x), and sends it as said request for withdrawal to said bank together with said amount of withdrawal x, said common key information KID and said user identification information IdU;

wherein said decrypting means comprises means for decrypting an encrypted issuer signature K(SKI(PKU, x)) received via said bank to obtain an issuer signature SKI(PKU, x);

wherein said signature verifying means comprises means for verifying the validity of said issuer signature SKI (PKU, x) with said public key PKI; and wherein said balance updating means comprises means for incrementing said balance counter in said storage means by x when said issuer signature SKI(PKU, x) is found valid by said signature verifying means.

20. The user equipment of claim 19, wherein: said key generating means generates, as said public key PKU and said secret key SKU, n public keys PKU1, PKU2, . . . , PKUn and n secret keys SKU1, SKU2, . . . , SKUn corresponding thereto, and stores them in said storage means, said n public keys being used as n pseudonyms; said encrypting means comprises means for encrypting said n pseudonyms and said common key K with said public key PKI to obtain encrypted information PKI(PKU1, PKU2, . . . , PKUn, K) and for sending them to said bank together with said user identification information IdU; and said decrypting means comprises means for decrypting an encrypted issuer signature received via said bank to obtain n signatures SKI (PKU1), SKI(PKU2), . . . , SKI(PKUn) as n licenses and said common key information KID; wherein:

at the time of requesting an issuance of electronic cash, said encrypting means encrypts a set of an arbitrarily selected one PKUi of said n pseudonyms and said amount of withdrawal x with said common key to obtain encrypted information K(PKUi, x) and sends it to said bank together with said amount x, said common key information KID and said user identification information IdU; said decrypting means decrypts said encrypted issuer signature K(SKI (PKUi, x) with said common key K to obtain an issuer signature SKI(PKUi, x) for said set of said selected pseudonym PKUi and said amount x; and said balance updating means increments said balance counter by said amount x; and wherein an arbitrary one of said n licenses is selected and used at the time of payment to said shop.

21. A recording medium having recorded thereon a program for a user equipment to implement a user signature as electronic cash in an electronic cash system which comprises issuer equipment as an institution far issuing a signature to an amount of electronic cash, user equipment as a user for receiving said signature issued from said issuer equipment and shop equipment as an institution for receiving payment, said program comprising:

a user registration procedure including steps of generating a signature verifying public key PKU and a signature generating secret key SKU corresponding thereto, then storing them in storage means, and sending them to an external institution together with user identification information IdU so as to register said public key PKU as a pseudonym; and receiving a signature of said external institution for said pseudonym, and recording it as a license in said storage means;

an electronic cash issuing procedure including steps of: sending a requested amount of issuance x and said pseudonym PKU to said issuer equipment; verifying the validity of an issuer signature SKI (PKU, x) with a public key PKI of said issuer equipment; upon receiving from said issuer equipment, as electronic cash, said issuer signature SKI(PKU, x) for said requested amount of issuance x and said pseudonym PKU, incrementing a balance counter set in said storage means by the amount x if said issuer signature SKI(PKU, x) is found valid by said verification without storing said electronic cash; and a payment procedure including steps of sending said pseudonym PKU and said license SKI(PKU) to said shop equipment; and upon receiving therefrom a challenge (Ids, Rs, Ts) associated with payment, generating a user signature SKU(y, Ids, Rs, Ts) from said challenge and the amount due y, then sending said user signature, SKU(y, Ids, Rs, Ts), to said shop as payment without sending said electronic cash; and decrementing said balance counter by said amount due y, where y—amount due to shop, Ids—shop real name, Rs—random number, and Ts—time information.

22. The recording medium of claim 21, wherein said electronic cash system further comprises a bank as an institution for managing an account of said user, said external institution is a trustee having a public key PKR and a secret key SKR corresponding thereto, and said electronic cash issuing procedure in said program for the execution by said user equipment further comprises the steps of: generating and storing a random number R in said storage means; generating blinded pseudonym Br(PKU, R) by blinding said pseudonym PKU with said random number R; sending said blinded pseudonym Br(PKU, R) as a request for issuance of electronic cash to said bank together with an amount of issue x and user identification information IdU; receiving from said bank a bank signature SKBx(Br(PKU, R)) corresponding to said amount x for said blinded pseudonym Br(PKU, R); unblinding said bank signature SKBx(Br(PKU, R)) with said random number R to extract a bank signature SKBx (PKU) for said pseudonym PKU as a coupon, and storing said extracted bank signature in said storage means, and sending said bank signature SKBx(PKU) as said coupon to said issuer equipment together with said pseudonym PKU and said amount x.

23. The recording medium of claim 21, wherein said electronic cash system further comprises a bank as an institution for managing an account of said user; said external institution is said issuer equipment; and wherein:

said user registration procedure in said program for the execution by said user equipment further comprises the steps of: generating and storing a common key K in said storage means; generating encrypted information PKI(PKU, K) by encrypting said pseudonym PKU and said common key K with said public key PKI; sending said encrypted information PKI(PKU, K) to said bank together with user identification information IdU; decrypting encrypted issuer signature K(SKI(PKU)) received via said bank with said common key K to extract said signature SKI(PKU); and verifying the validity of said signature SKI(PKU) with said public key PKI and, if valid, storing it as said license in said storage means; and said electronic cash issuing procedure further comprises of: generating encrypted information PKI(PKU, x, K) by encrypting said pseudonym PKU, an amount x and said common key K with said public key PKI, and sending said encrypted information PKI(PKU, x, K) to said bank together with said user identification information IdU and said amount x; and receiving encrypted issuer signature K(SKI (PKU, x)) generated by encrypting said pseudonym PKU and said amount x with said common key K, and decrypting said encrypted issuer signature K(SKI(PKU, x)) with said common key K to obtain said issuer signature SKI (PKU, x).

24. The recording medium of claim 21, wherein said electronic cash system further comprises a bank as an institution for managing an account of said user; said external institution is said issuer equipment; wherein:

said user registration procedure in said program for the execution by said user equipment further comprises the steps of: generating and storing a common key K in said storage means; generating encrypted information PKI(PKU, K) by encrypting said pseudonym PKU and said common key K with said public key PKI;

sending said encrypted information PKI(PKU, K) to said bank together with user identification information IdU; decrypting encrypted issuer signature K(SKI(PKU)), KID received via said bank with said common key K to extract said signature SKI(PKU) and common key information KID added by said issuer equipment to said common key K; and verifying the validity of said signature SKI(PKU) with said public key PKI and, if valid, storing said signature SKI(PKU) as said license and said KID in said storage means; and said electronic cash issuing procedure comprises steps of: generating encrypted information K(PKU, x) by encrypting said pseudonym PKU and the amount x with said common key K, and sending said encrypted information K(PKU, x) to said bank together with said user identification information IdU, said common key information KID and said amount x; and receiving encrypted issuer signature K(SKI(PKU, x)) generated by encrypting said issuer signature SKI(PKU, x) with said common key K, and decrypting said encrypted issuer signature K(SKI(PKU, x)) with said common key K to obtain said issuer signature SKI(PKU, x).

25. The recording medium of claim 24, wherein:

said user registration procedure in said program for the execution by said user equipment further comprises the steps of: generating n public keys PKU1, PKU2, . . . , PKUn as said public key PKU and n secret keys SKU1, SKU2, . . . , SKUn as said secret key SKU; storing them in said storage means; encrypting said n public keys as said n pseudonyms and said common key K with said public key PKI to obtain encrypted information PKI (PKU1, PKU2, . . . , PKUn, K); sending it to said bank together with said user identification information IdU; decrypting, an encrypted issuer signature K(SKI (PKU1), SKI(PKU2), ..., SKI(PKUn), KID) for said n pseudonyms, received via said bank, with said common key K to extract n issuer signatures SKI(PKU1), SKI (PKU2), ..., SKI(PKUn) and common key information KID added by said issuer equipment to said common key K; and verifying the validity of said n signatures with said public key PKI and, if valid, storing said n signature as n licenses and said common key information KID in said storage means;

said electronic cash issuing procedure of said program for the execution by said user equipment comprises the steps of: encrypting an arbitrarily selected one PKUi of said n pseudonyms and said amount x with said common key K to obtain encrypted information PKI(PKUi, x); sending it to said bank together with said user identification information IdU, said common key information KID and said amount x; receiving an encrypted issuer signature K(SKI(PKUi, x)) generated by encrypting an issuer signature SKI(PKUi, x) to said selected pseudonym PKUi and said amount x with said common key K; decrypting said encrypted issuer signature with said common key K to obtain an issuer signature SKI(PKUi, x); and verifying the validity of said issuer signature SKI (PKUi, x) with said issuer public key PKI and, if valid, incrementing said balance counter by x; and said payment procedure comprises the steps of selecting an arbitrary one of said pseudonyms PKU1, PKU2, ..., PKUn and using it as said pseudonym in the payment to said shop.

* * * * *